United States Patent
Gottschlich et al.

(10) Patent No.: US 11,258,813 B2
(45) Date of Patent: Feb. 22, 2022

(54) SYSTEMS AND METHODS TO FINGERPRINT AND CLASSIFY APPLICATION BEHAVIORS USING TELEMETRY

(71) Applicant: Intel Corporation, Santa Clara, CA (US)

(72) Inventors: Justin Gottschlich, Santa Clara, CA (US); Rachit Mathur, Hillsboro, OR (US); Zheng Zhang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 16/455,189

(22) Filed: Jun. 27, 2019

(65) Prior Publication Data

US 2019/0319977 A1    Oct. 17, 2019

(51) Int. Cl.
*H04L 29/06* (2006.01)
*G06K 9/62* (2006.01)
*G06F 21/55* (2013.01)
*G06F 21/56* (2013.01)

(52) U.S. Cl.
CPC ........ *H04L 63/1425* (2013.01); *G06F 21/554* (2013.01); *G06F 21/566* (2013.01); *G06K 9/6256* (2013.01); *H04L 63/1416* (2013.01); *H04L 63/1433* (2013.01)

(58) Field of Classification Search
CPC ............. H04L 63/1425; H04L 63/1416; H04L 63/1433; H04L 63/1408; G06K 9/6256; G06F 21/566; G06F 21/554
USPC ......................................................... 726/22
See application file for complete search history.

(56) References Cited

U.S. PATENT DOCUMENTS

| | | | |
|---|---|---|---|
| 9,736,147 B1 * | 8/2017 | Mead | H04L 9/3239 |
| 9,998,484 B1 * | 6/2018 | Buyukkayhan | G06F 16/285 |
| 10,122,742 B1 * | 11/2018 | Oprea | H04L 67/10 |
| 10,218,740 B1 * | 2/2019 | Mesdaq | H04L 63/145 |
| 10,230,749 B1 * | 3/2019 | Rostami-Hesarsorkh | G06F 21/552 |
| 10,432,648 B1 * | 10/2019 | Xu | H04L 63/145 |

(Continued)

OTHER PUBLICATIONS

Gottschlich et al., "The Three Pillars of Machine Programming" MAPL 2018: Proceedings of the 2nd ACM SIGPLAN International Workshop on Machine Learning and Programming LanguagesJun. 2018, 11 pages.

(Continued)

*Primary Examiner* — Badri Narayanan Champakesan
(74) *Attorney, Agent, or Firm* — Hanley, Flight & Zimmerman, LLC

(57) ABSTRACT

Apparatus, systems, methods, and articles of manufacture for fingerprinting and classifying application behaviors using telemetry are disclosed. An example apparatus includes a trace processor to process events in a processor trace to capture application execution behavior; a fingerprint extractor to extract a first fingerprint from the captured application execution behavior and performance monitor information; a fingerprint clusterer to, in a training mode cluster the first fingerprint and the second fingerprint into a cluster of fingerprints to be stored in a fingerprint database with a classification; and a fingerprint classifier to, in a deployed mode, classify a third fingerprint, the fingerprint classifier to trigger a remedial action when the classification is malicious.

29 Claims, 13 Drawing Sheets

(56) References Cited

U.S. PATENT DOCUMENTS

| | | | | |
|---|---|---|---|---|
| 10,484,419 B1* | 11/2019 | Davis | ................ | G06F 21/577 |
| 10,491,627 B1* | 11/2019 | Su | ................ | H04L 63/1416 |
| 10,893,058 B1* | 1/2021 | Casaburi | ............ | H04L 63/1416 |
| 2011/0271341 A1* | 11/2011 | Satish | ................ | G06F 21/562 |
| | | | | 726/23 |
| 2017/0193229 A1* | 7/2017 | RoyChowdhury | ... | G06F 21/564 |
| 2018/0007099 A1* | 1/2018 | Ein-Gil | ................ | G06F 9/468 |
| 2019/0180030 A1* | 6/2019 | Wei | ................ | G06F 21/566 |
| 2019/0260793 A1* | 8/2019 | Stockdale | ............ | H04L 43/045 |
| 2020/0074081 A1* | 3/2020 | Srinivasagopalan | ................ | |
| | | | | G06F 21/552 |
| 2020/0213339 A1* | 7/2020 | Ivanov | ............... | H04L 63/1425 |

OTHER PUBLICATIONS

"Software Supply Chain Attacks," NIST, [Online], Available: https://csrc.nist.gov/CSRC/media/Projects/Supply-Chain-Risk-Management/documents/ssca/2017-winter/NCSC_Placemat.pdf., retrieved on Jul. 4, 2019, 2 pages.

"Supply chain attacks," retrieved from, https://docs.microsoft.com/en-us/windows/security/threat-protection/intelligence/supply-chain-malware, May 31, 2019, 3 pages.

Gralla, "Malware Takes Aim At Supply Chain," Symantec, [Online]. Available: https://www.symantec.com/blogs/expert-perspectives/malware-takes-aim-supply-chain., May 9, 2018, 5 pages.

Wikipedia, "Jaccard index," [Online]. Available: https://en.wikipedia.org/wiki/Jaccard_index, last retrieved on Jul. 24, 2019, 7 pages.

Wikipedia, "Hamming distance," [Online]. Available: https://en.wikipedia.org/wiki/Hamming_distance, last retrieved on Jul. 24, 2019, 5 pages.

Wikipedia, "Euclidean distance," [Online]. Available: https://en.wikipedia.org/wiki/Euclidean_distance, last retrieved on Jul. 24, 2019, 3 pages.

Wikipedia, "Cosine similarity," [Online]. Available: https://en.wikipedia.org/wiki/Cosine_similarity, last retrieved on Jul. 24, 2019, 6 pages.

* cited by examiner

SYSTEMS AND METHODS TO FINGERPRINT AND CLASSIFY APPLICATION BEHAVIORS USING TELEMETRY

FIELD OF THE DISCLOSURE

This disclosure relates generally to application classification, and, more particularly, to fingerprinting and classifying application behaviors using telemetry.

BACKGROUND

A software supply chain represents a process or sequence of processes to generate and distribute software from a provider to a target customer. As such, attacks on software supply chains are increasingly becoming an important infection vector for attackers. By attacking the software supply chain, an attacker first penetrates into an independent software vendor (ISV) network to embed a malicious payload into a software package provided by the ISV.

When a user downloads and installs the infected software package and/or update, the user's endpoint system is infected. Because these infected software installations/updates are provided from a trusted source, the file(s) are often whitelisted and not analyzed by security solutions. Even when the infected application is analyzed, the embedded payload is difficult to detect because the malicious features are deeply intermingled with original 'clean' program behavior and, often, not malicious enough to raise alarms for existing systems. In addition, such malware commonly uses various detection evasion techniques, such as software packing and encryption, sandbox detection, file-less, etc., to eliminate the effectiveness of traditional static and dynamic security analysis.

DETAILED DESCRIPTION

Figure 1:
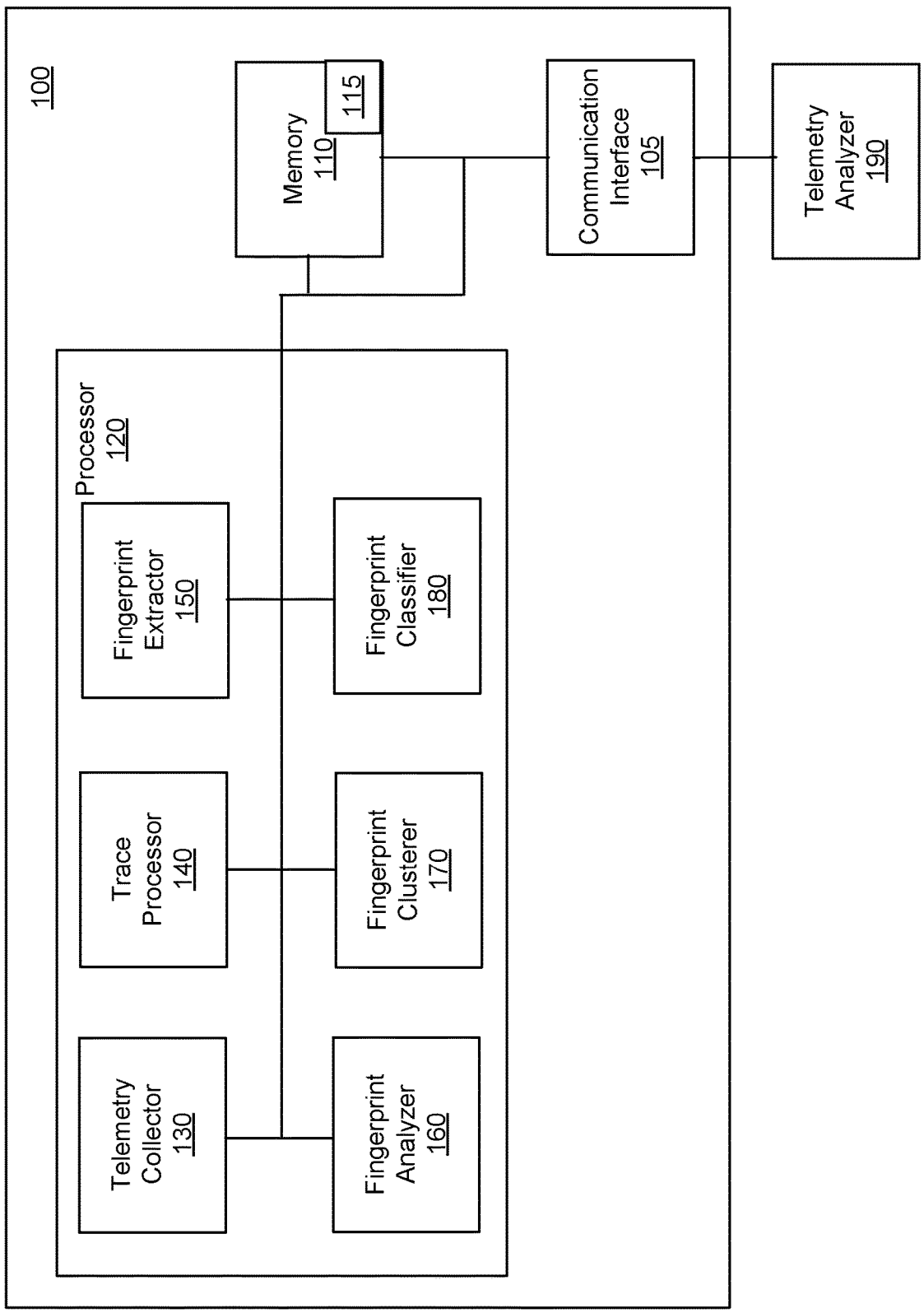
FIG. 1 is a block diagram of an example system to classify executable applications according to fingerprints.

Disclosed herein are systems, apparatus, methods, and articles of manufacture to determine application behavior using telemetry information. For example, a fingerprint or signature of an application's behavior can be generated using hardware telemetry. While traditional solutions have no visibility into execution-related attributes from hardware telemetry, certain examples provide a new fingerprint that allows security programs to detect supply chain attacks by including hardware telemetry attributes to distinguish when the execution profile of an independent software vendor (ISV) software package has significantly deviated from expected benign behavior.

For example, fingerprints can help security products to decide whether an unknown program is behaviorally similar to a known application or malware family. Fingerprints can help security products evaluate whether an updated software file is behaving similarly to a previous version, for example. Fingerprints can help security products determine whether an application behaves as it is expected to behave, for example.

Telemetry refers to an automated communications process by which measurements and other data are collected at remote or inaccessible points for real-time processing. Telemetry is distinct from logging, which is focused on capturing program internal states into log files for debugging and offline analysis. Instead, telemetry enables automated data gathering and processing to turn a collection of raw data into actionable analytics. For example, software telemetry gathers data related to application use, operating system execution, program components, etc. For example, software telemetry can include a measure of how often certain program features are executed, start-up time measurement, processing time measurement, application crash/failure, usage statistics, etc. Hardware telemetry reads configuration information, content, operating metrics, performance statistics, usage data, failure information, etc., from one or more hardware components of a system, for example. Telemetry information can be gathered remotely via one or more sensors, monitors, etc., and transmitted to a device or system for analysis and action, for example.

Unlike traditional solutions that cannot capture or harness program behavioral information, certain examples develop fingerprints using telemetry information, such as hardware telemetry, software telemetry, etc., that can be helpful in generating attributes to identify and stop malware and/or other malicious threats, when the threat is running. Since threats delivered via supply chain attacks come from trusted applications and may execute from in-memory code (e.g., with no associated module on disk, etc.), hardware telemetry, for example, provides an important vantage point over the software telemetry to profile and detect such attacks.

While some prior solutions leverage application fingerprint information (e.g., application static images, file system and network behaviors, etc.), such anti-virus (AV) and behavioral detection solutions lack a vantage point into execution of programs. Such solutions can also be bypassed through static and dynamic polymorphism. For example, ransomware and crypto jacking malware can bypass security software through packing and encryption, and file-less Trojan malware can pretend to be a legitimate application by leveraging a stolen certificate to download and execute malicious payload at runtime directly from memory.

Instead, certain examples extract application behavioral fingerprints from hardware telemetry, such as central processing unit (CPU) telemetry, etc. Certain examples provide systems and methods to apply these fingerprints to measure program similarities to identify and protect against malware and/or other malicious software. Certain examples develop a training and detection pipeline to measure and classify an application's CPU fingerprint(s). Features can be extracted from CPU telemetry and from operating system (OS) telemetry between software updates, and CPU fingerprints can be formed from the feature information, for example. In certain examples, a cloud-based platform (e.g., a cloud security server, etc.) can be used to aggregate information to monitor and learn CPU fingerprint telemetry on a continuous and/or other ongoing basis (e.g., periodically, on-demand, etc.). Hardware fingerprints are formed to describe application computation and control flow behavior, which are not available through existing OS telemetry. Therefore, the hardware fingerprints can enhance software-based solutions for application analysis, detection, and remediation, for example.

Certain examples fingerprint execution of a computer program for security purposes using telemetry, such as CPU and OS telemetry, etc., information. In certain examples, clusters of fingerprints are constructed, and fingerprint similarities are measured. In certain examples, hardware and software telemetry events are fingerprinted and analyzed according to three modes: a training mode, a detection mode, and a learning mode.

For example, in a controlled environment, the training mode processes CPU and OS telemetry events for known applications, extracts their fingerprints, learns the fingerprint clusters, and stores the clusters in a fingerprint cluster database. At a production endpoint, server, etc., the detection mode processes behaviors of unknown applications, compares their fingerprints with the fingerprint clusters in the fingerprint cluster database, and computes fingerprint similarity vectors, which can be further processed by ISV classifiers, for example. If implemented, the continuous learning mode leverages a security cloud infrastructure to analyze the fingerprint telemetry from multiple endpoints and determines whether the telemetry are true positives or false positives, for example. For true positives, a security application marks the related software binaries as infected and blacklisted, for example. For false positives, the security application updates the fingerprint cluster database to include the new fingerprints so that subsequent processing does not falsely identify the fingerprint as malicious.

In certain examples, fingerprints can be clustered and/or telemetry analysis can be facilitated using artificial intelligence. Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of ML models and/or ML architectures exist. In examples disclosed herein, a neural network model is used. In general, ML models/architectures that are suitable to use in the example approaches disclosed herein include semi-supervised ML. However, other types of ML models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the ML model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the ML model (e.g., a classification, an expected output value, etc.). Alternatively, unsupervised training (e.g., used in DL, a subset of ML, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed until an acceptable amount of error is achieved. In examples disclosed herein, training is performed at remotely for example, at a data center and/or via cloud-based operation. Training is performed using hyperparameters that control how the learning is performed (e.g., a learning rate, a number of layers to be used in the ML model, etc.).

Training is performed using training data. In examples disclosed herein, the training data is locally generated data that originates from a demonstration of a task by a human. Once training is complete, the model is deployed for use as an executable construct that processes an input and provides an output based on the network of nodes and connections defined in the model.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the ML model. Also, in some examples, the output data may undergo post-processing after being generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Turning to the Figures, FIG. 1 is a block diagram of an example system 100 to generate application fingerprints, classify application behavior using the fingerprints, and remediate malicious applications based on the classification of behavior. The example system 100 includes a communication interface 105, memory 110, and a fingerprint processor 120. As shown in the example of FIG. 1, the fingerprint processor 120 includes a telemetry collector 130, a trace processor 140, a fingerprint extractor 150, a fingerprint analyzer 160, a fingerprint clusterer 170, and a fingerprint classifier 180. The memory 110 can include a fingerprint database and/or other data store 115, for example. In certain examples, the communication interface 105 of the system 100 is a wireless and/or wired communication interface to communicate with a telemetry analyzer 190. While the telemetry analyzer 190 is shown separated from the rest of the elements of the system 100 in the example of FIG. 1, the telemetry analyzer 190 can be included with the other elements of the example system 100.

As shown in the example of FIG. 1, the telemetry collector 130 processes events including hardware and software telemetry events (e.g., data captured with respect to operation, configuration, execution, error, etc., for hardware, software, firmware, etc.). The telemetry collector 130 begins to collect the telemetry events when a process of a monitored application begins execution and provides them for processing by the trace processor 140 after the process has terminated.

For example, the telemetry collector 130 can request CPU telemetry events including a processor trace and/or other source of CPU control flow information, one or more performance monitor unit (PMU) counters, etc., gathered over a time interval. For example, the telemetry collector 130 can request OS telemetry events including process signals (e.g., for process start and terminate events, etc.), dynamic linked library (DLL) signals (e.g., for DLL load and unload events, etc.), etc. The processor trace collected by the telemetry collector 130 allows the trace processor 140 to profile branch execution flow from the CPU and/or other processor to determine application behavior, for example. A change in the execution flow can be used to identify branches that deviate to bypass security protection and cause damage.

In certain examples, hardware registers can be used to capture events for reading by the telemetry collector 130. By inspecting register state and usage of application programming interface (API) calls, the telemetry collector 130 can gather CPU and OS telemetry events to form the process trace for further analysis, for example.

In certain examples, CPU telemetry information can be provided to the telemetry collector 130 from one or more performance counters providing counter values at a time (e.g., time 1 with counter value 1, counter value 2, counter value 3, etc., and time 2 with counter value 4, counter value 5, counter value 6, etc.). A processor trace can be a set of encoded values including taken/not taken (TNT) packet(s), target Internet Protocol (TIP) packet(s), packet generation enable (PGE) packet(s), packet generation disable (PGD) packet(s), flow update (FUP) packet(s), packet stream boundary (PSB) packet(s), etc. OS telemetry information can be provided as a series of process and thread events such as process1 start, thread1 start, thread2 terminate, process3 start, etc. DLL events can be captured by the telemetry collector 130 in a sequence such as DLL1 load, DLL2 load, DLL3 unload, etc.

The example trace processor 140 of FIG. 1 processes the gathered processor trace data to abstract information included in the trace and capture program behavior from the abstracted processor control flow information. In certain examples, a plurality of aspects of program execution are extracted from the processor trace information, such as invariant and coarse-granularity target address information, API call sequences, just in time (JIT) and shell code execution, etc.

For example, with respect to invariant and coarse-granularity target address information, analysis of the trace can capture which section(s) of loaded image(s) are being used during execution of a program. For example, jumps in program execution across code image sections can be identified as indicative of particular program behavior. For example, the trace processor 140 can process processor trace information to identify obfuscation techniques that result in code executing from sections such as resource, relocation etc., that are not typically generated by compilers. The example trace processor 140 can additionally and/or alternatively process trace information to identify rootkit programs that "hide" their code in a header area of loaded modules. The example trace processor 140 can additionally and/or alternatively process trace information to identify file-less threat techniques of reflective DLL loading and/or remote thread injection which execute code from pages "on heap" (e.g., loaded in memory allocated for Java and/or other class instances and arrays, etc.) that do not belong to a particular loaded module. The example trace processor 140 can additionally and/or alternatively process trace information to identify malware that executes code from unusual regions such as stack or environmental pages, etc.

The trace processor 140 can additionally and/or alternatively capture and process an API call sequence of a program based on the processor trace. For example, the trace processor 140 can analyze the trace to determine when a program code jump destination is an API start address and capture those segments or portions of processor activity from the trace.

The trace processor 140 can additionally and/or alternatively capture and process Just-In-Time (JIT) and shell code execution events from the processor trace. For example, the trace processor 140 can analyze the trace to capture incidents when the CPU executed instructions located in allocated heap memories.

The trace processor 140 translates the control flow information in CPU telemetry into a tuple of "module name" and "section name", in which "module name" is the name of an executable module that includes a control flow address and "section name" is the pseudo name of a code section within which the control flow address resides. For example, if a program 'Test.exe' has a portable executable (PE) header and three sections named 'text', 'data', and 'rsrc', then the trace processor 140 can identify and label sections named "Test.exe!header", "Test.exe!sect-0", "Test.exe!sect-1", and "Test.exe!sect-2", for example.

The trace processor 140 can also identify exported API(s) from modules such as DLLs, etc., as points of interest that can be encoded such as "Test.exe!api-<API_NAME>", for example. Addresses that do not belong to a DLL can be encoded as a special string, such as "heap!0", etc.

Thus, the control or execution flow of an application or other process can be captured by the trace processor 140 from events gathered by the telemetry collector 130 from CPU and OS execution. In a training mode or phase, known application and/or other process behavior can be extracted from the trace and verified to help ensure that the trace processor 140 is correctly analyzing and characterizing the execution flow. The trace processor 140 can evaluate CPU and OS telemetry events and combine process trace information with process address space layout information such as executable file sections, API calls, etc. As such, process trace information may be combined with process address space layout information (e.g., executable file sections, API calls, etc.) to process a series of process trace events.

In certain examples, the fingerprint extractor 150 extracts or forms a process fingerprint from the processed trace information from the trace processor 140 and other process event information such as PMU counter(s), etc. For example, an application CPU fingerprint generated by the fingerprint extractor 150 includes a histogram of each PMU counter and histogram(s) of one or more N-gram sets of the processed trace from the trace processor 140. Each histogram represents a distribution of its corresponding numerical data and can represent a probability distribution of the associated value(s). As such, in certain examples, a fingerprint is a collection of histograms representing the application and/or other process execution.

In certain examples, multiple executions of a program being profiled can be carried out based on exercising various functionalities of the program/application. In certain examples, the trace processor 140 does not tightly capture all control flow information provided by the processor trace and, instead, captures a subset of features to characterize signals or indications of compromise in control flow. As such, the fingerprint extracted by the fingerprint extractor 150 is not brittle and can accommodate legitimate software application updates while highlighting instances of compromise, or potential/likely compromise, in application control flow, for example.

Figure 2:
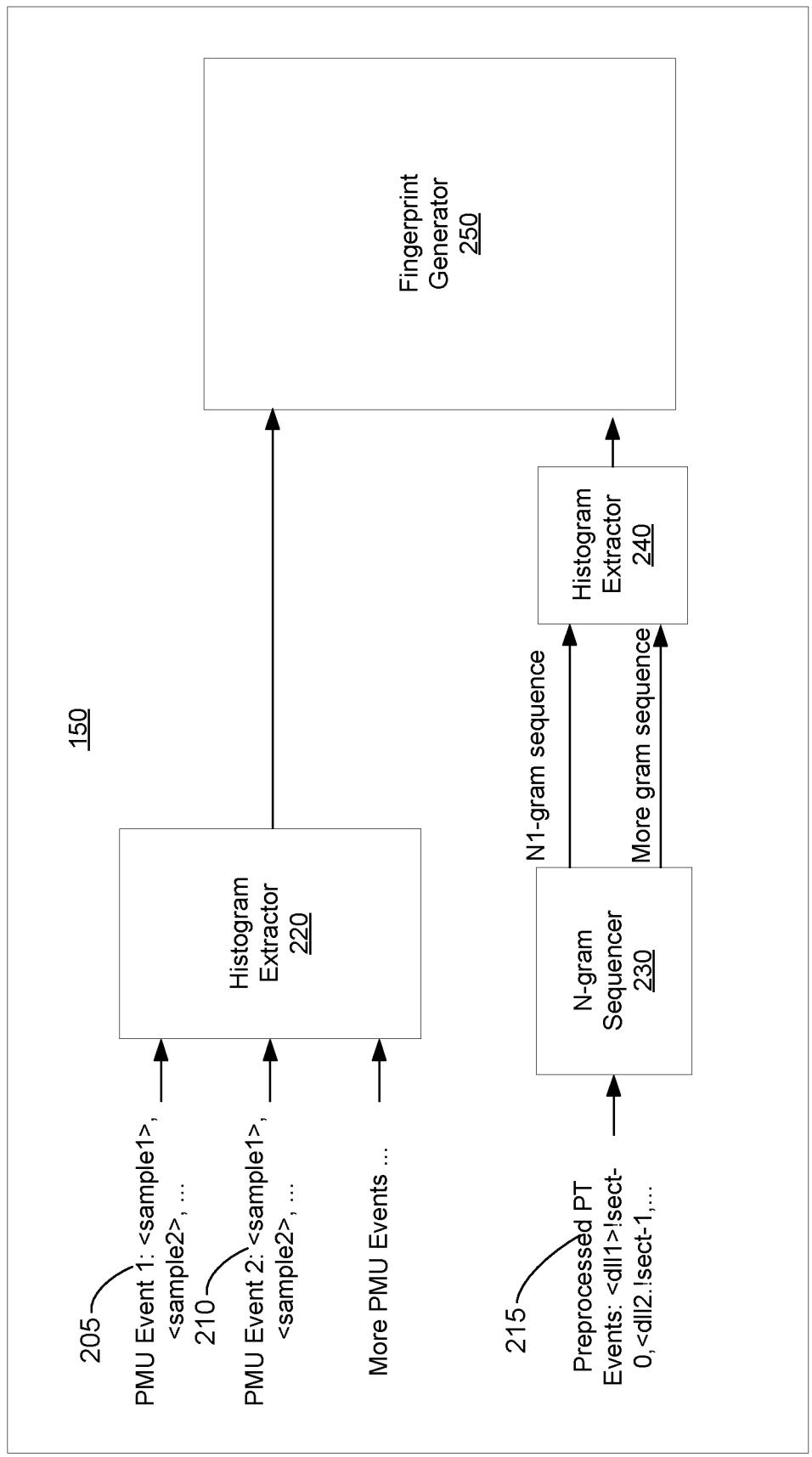
FIG. 2 illustrates an example implementation of the fingerprint extractor of FIG. 1.

For example, FIG. 2 illustrates an example implementation of the fingerprint extractor 150. As shown in the example of FIG. 2, PMU events 205, 210 are processed by a first histogram extractor 220 to form a first histogram extraction. Processed trace information 215 from the trace processor 140 is processed by an N-gram sequencer 230 to form one or more N-gram sequences. The N-gram sequence(s) are provided to a second histogram extractor 240 to form a second histogram extraction. The first and second histogram extractions are provided to a fingerprint generator 250 to form the process fingerprint. An example process fingerprint includes a histogram of each PMU event and a histogram of each N-gram processor trace sequence, for example.

The fingerprint analyzer 160 processes fingerprints extracted by the fingerprint extractor 150 to determine similarity between two fingerprints. For example, the fingerprint analyzer 160 uses one or more distance metrics to measure a similarity between two histograms, h1 and h2. For example, the fingerprint analyzer 160 measures similarity between histograms using one or more of a Jaccard distance, a Hamming distance, a Euclidean distance, a cosine similarity, etc. When comparing two fingerprints, the fingerprint analyzer 160 creates a fingerprint similarity feature vector in which each field corresponds to a distance metric between the matching histograms in the two fingerprints, for example.

Figure 3:
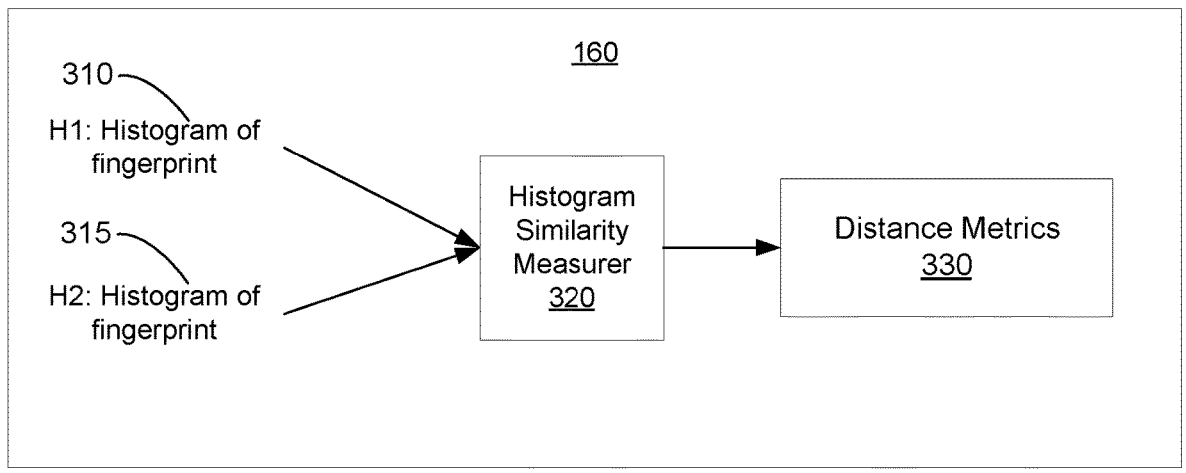
FIG. 3 illustrates an example implementation of the fingerprint analyzer of FIG. 1.

For example, as illustrated in FIG. 3, two histograms 310, 315 are provided to a histogram similarity measurer 320 in the example fingerprint analyzer 160. The example histogram similarity measurer 320 processes elements of the two histograms 310, 315 to determine one or more distance metrics 330 such as a Jaccard distance, a Hamming distance, a Euclidean distance, a Cosine similarity, etc. For example, a Jaccard distance is a measure of dissimilarity between two data sets determined by subtracting an intersection over union of the two datasets from 100%. The Jaccard distance between two application and/or other program/process fingerprints indicates that the two fingerprints are similar when the distance is within a similarity threshold of 10%, for example. A Hamming distance is a number of bits that are different between two binary vectors. For example, the Hamming distance between two application fingerprints indicates that the two fingerprints are similar when the distance is within a similarity threshold of 4, for example. A Euclidean distance is a comparison of straight-line distance between variables in vectors X and Y. For example, the Euclidean distance between two application fingerprints indicates that the two fingerprints are similar when the distance is within a similarity threshold of 5, for example. Cosine similarity is a measure of similarity between two non-zero vectors of an inner product space that measures the cosine of the angle between them). For example, the cosine similarity between two application fingerprints indicates that the two fingerprints are similar when the distance is within a similarity threshold of 0.8, for example.

The example fingerprint clusterer 170 is active during a training phase to cluster fingerprints of multiple processor traces from a training application set. The fingerprints are clustered by the clusterer 170 based on the similarity measurements determined by the fingerprint analyzer 160. Results of the clustering (e.g., cluster centroids, sizes, and diameters, etc.) are stored in the fingerprint database 115 in memory 110, for example. In certain examples, the fingerprint clusterer 170 learns or is trained to cluster fingerprints using unsupervised learning with unlabeled samples from a same program family. Such one-class training with known results can be used to train the fingerprint clusterer 170 to identify similar fingerprints that should be clustered and classified together, for example. Alternatively, a neural network can be used in supervised learning with labeled samples from a plurality of classes.

As such, the fingerprint database 115 in memory 110 is trained with clusters of similar fingerprints and an associated classification. Once deployed after training by the fingerprint clusterer 170, the fingerprint database 115 is used by the fingerprint classifier 180 to classify new process fingerprints based on a distance and/or other similarity between the new fingerprint and a cluster of known, classified fingerprints in the fingerprint database 115, for example.

The example fingerprint classifier 180 of FIG. 1 is active during a detection phase to classify a fingerprint of an unknown application based on the cluster prototypes stored in the fingerprint database 115 of the memory 110. Distances between the fingerprint and one or more closest fingerprint clusters determined by the fingerprint clusterer 170 and stored in the fingerprint database 115 of memory 110 are included in a classification vector. The classification vector is fed into a next-level classification model, which combines the inputs from additional static and dynamic analysis features to produce a high-confidence classification decision. A fingerprint and/or an application associated with the fingerprint can be blacklisted or whitelisted, halted from execution or allowed to execute, quarantined or allowed to remain in memory 110, etc., based on the classification decision of the fingerprint classifier 180, for example.

Figure 4:
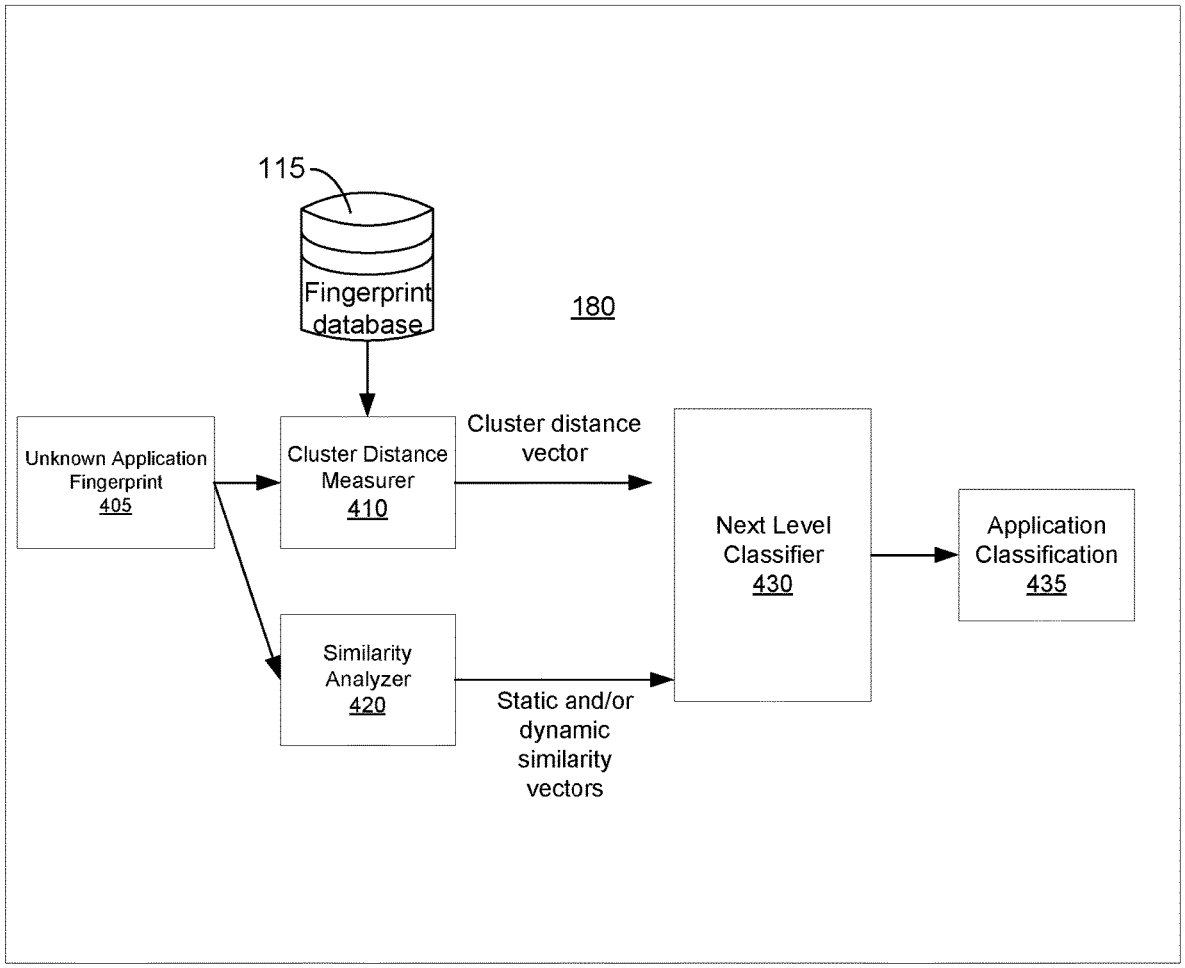
FIG. 4 illustrates an example implementation of the fingerprint classifier of FIG. 1.

FIG. 4 illustrates an example implementation of the fingerprint classifier 180. The fingerprint classifier 180 of FIG. 4 is to classify an unknown application fingerprint 405 using fingerprint cluster distances and static similarity vectors. The example fingerprint classifier 180 includes a cluster distance measurer 410 to extract fingerprint cluster information from the fingerprint database 115 of the memory 110 along with the fingerprint 405 of an unidentified application to form a cluster distance vector. The example fingerprint classifier 180 also includes a similarity analyzer 420 to process the fingerprint 405 of the unknown application with static and dynamic similarity analysis to generate one or more static and/or dynamic similarity vectors. The static similarity vectors measure how similar a sample file is to known files, such as by using file size, PE geometry, imported APIs, etc. The dynamic similarity vectors measure how similar a sample behaves to known applications, such as using process genealogy, file and registry accesses, network activities, etc.

In the example of FIG. 4, the cluster distance vector and the static and/or dynamic similarity vector(s) are provided to a next level classifier 430 to generate a classification 435 of the application. In certain examples, the next-level classifier 430 of the fingerprint classifier 180 can include a deployed model trained by the fingerprint clusterer 170 to identify similar fingerprints. For example, if the fingerprint 405 of the unclassified application is similar to (e.g., within a threshold distance or tolerance of) a cluster of fingerprints that has been identified as malicious, fraudulent, or harmful, then the application can be given the same classification 435 of malicious, fraudulent, harmful, etc. (e.g., classified as malware, as a virus, as spam, etc.). If the fingerprint 405 of the unclassified application is similar to (e.g., within a threshold distance or tolerance of) a cluster of application fingerprints that has been identified as benign, then the application can be classified 435 as benign, for example. However, in some examples, when the fingerprint of the unclassified application is similar to (e.g., within a threshold distance or tolerance of) a cluster of application fingerprints that has been identified as benign, the additional static and/or dynamic similarity vector(s) are factored into the classification 435 to determine whether the unidentified application fingerprint is indicative of a benign or malicious application.

In certain examples, the fingerprint classifier 180 is to trigger an alert, a remedial action, etc., based on the classification of the fingerprint. For example, a fingerprint and/or application associated with the fingerprint can be marked in the memory 110 as blacklisted when the next level classifier 430 of the fingerprint classifier 180 determines that the fingerprint is indicative of a malicious, fraudulent, or harmful application. A fingerprint and/or application associated with the fingerprint can be marked in the memory 110 as whitelisted when the next level classifier 430 of the fingerprint classifier 180 determines that the fingerprint is indicative of a benign application, for example.

When the fingerprint is classified as malicious, etc., the fingerprint classifier 180 can remediate the malicious application by triggering a remedial action to halt application execution, delete or quarantine the application, etc. Alternatively or in addition, the fingerprint classifier 180 can initiate a communication or alert to notify an external system and/or user regarding the application and its classification, etc.

In certain examples, such as shown in the example of FIG. 1, the processor 120 communicates with the telemetry analyzer 190 via the communication interface 105. The telemetry analyzer 190 can be implemented using a cloud-based server, for example.

In some examples, an identification of a match or a deviation in a fingerprint being classified triggers the telemetry analyzer 190 to confirm that the fingerprint has deviated from a fingerprint or cluster of fingerprints stored in the fingerprint database 115 and/or matches a fingerprint or cluster of fingerprints stored in the fingerprint database 115 and should be classified accordingly as benign or malicious, for example. For instance, when the fingerprint classifier 180 determines that the fingerprint being examined matches a cluster of known malicious fingerprints from the fingerprint database 115, the fingerprint classifier 180 can trigger the telemetry analyzer 190 to confirm the classification from a plurality of systems (e.g., via the cloud, etc.). Alternatively or in addition, when the fingerprint classifier 180 determines that the fingerprint being examined deviates from a known fingerprint or cluster of fingerprints previously determined to be benign in the fingerprint database 115, the fingerprint classifier 180 can trigger the telemetry analyzer 190 to confirm that the deviation from known benign fingerprints indicates that the fingerprint being examined is malicious, for example.

In certain examples, the telemetry analyzer 190 is a machine learning construct that enables continuous learning to classify fingerprints and associated applications based on an input fingerprint classification vector from the fingerprint classifier 180. For example, a cloud-based telemetry analyzer 190 can confirm whether a fingerprint and/or its associated application is actually benign or malicious using a classification vector from the processor 120 in conjunction with crowd telemetry from a plurality of systems providing information to the telemetry analyzer 190. The telemetry analyzer 190 can perform a deep binary analysis of the fingerprint and application information, for example. Other security intelligence and/or advanced machine learning models can be leveraged by the telemetry analyzer 190 as well. For example, the telemetry analyzer 190 can query security intelligence database(s) to determine whether program behavior(s) and/or artifact(s) are associated with certain application or malware families. In another example, the telemetry analyzer 190 can apply machine learning models to determine how likely the program fingerprints and artifacts belongs to benign or malicious classes.

In certain examples, based on analysis of the telemetry analyzer 190, the fingerprint and/or an application associated with the fingerprint can be blacklisted or whitelisted, halted from execution or allowed to execute, quarantined or allowed to remain in memory 110, etc., based on the classification decision of the fingerprint classifier 180, for example. Malicious alerts of the fingerprint classifier 180 that have been verified by the telemetry analyzer 190 can be reported and the related application(s) marked as malicious and blacklisted in the fingerprint database 115, for example. When a malicious file alert generated by the fingerprint classifier 180 is determined by the telemetry analyzer 190 to be benign, the fingerprint database 115 can be updated so that the fingerprint is not subsequently evaluated as malicious by the fingerprint classifier 180, for example.

Figure 5:
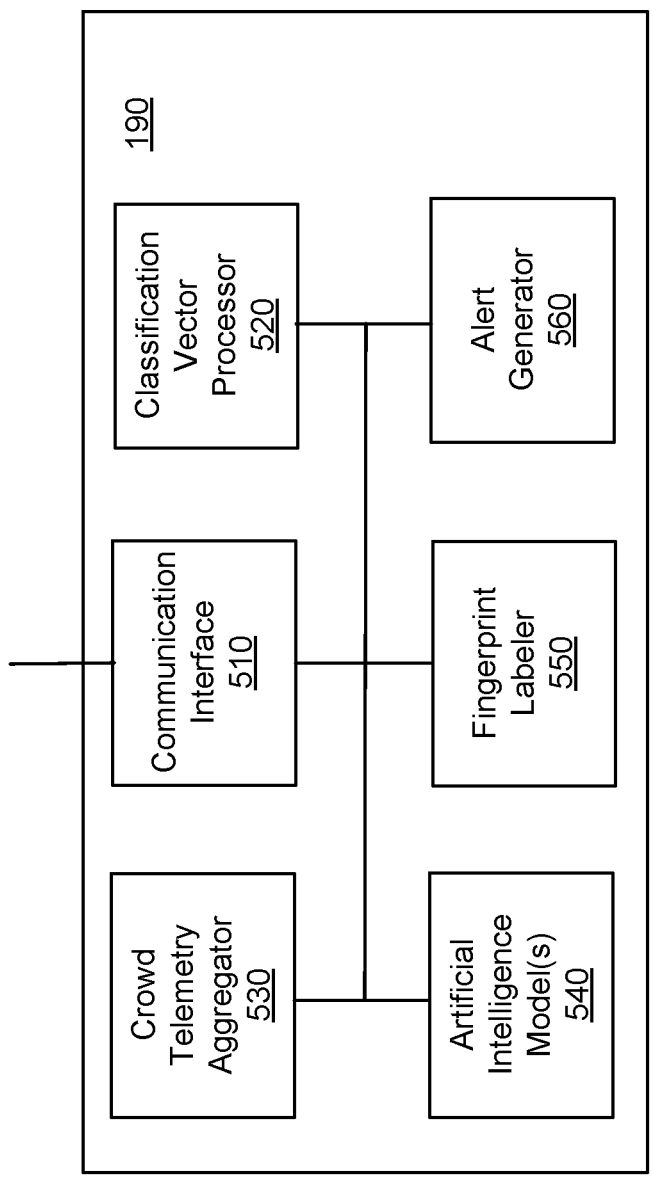
FIG. 5 illustrates an example implementation of the telemetry analyzer of FIG. 1.

FIG. 5 depicts an example telemetry analyzer 190 including a communication interface 510, a classification vector processor 520, a crowd telemetry aggregator 530, artificial intelligence model(s) 540, a fingerprint labeler 550, and an alert generator 560. As shown in the example of FIG. 5, the communication interface 510 receives an input fingerprint classification vector from the fingerprint classifier 180. The classification vector processor 520 analyzes the fingerprint classification vector to verify the classification determined by the fingerprint classifier 180. For example, the crowd telemetry aggregator 530 gathers telemetry information from a plurality of systems exposed to same or similar fingerprints. The classification vector processor can train and deploy and/or otherwise leverage artificial intelligence model(s) 540 to model fingerprint classifications based on the crowd telemetry and apply the classification to the input vector, for example. The classification vector processor 520 can perform a deep binary analysis of the fingerprint and application information in conjunction with security intelligence and/or advanced machine learning models, for example. The fingerprint labeler 550 can then label and/or confirm a labeling of the fingerprint and/or fingerprint class associated with the fingerprint classification vector as benign, malicious, etc. The alert generator 560 can trigger, based on the labeling of the fingerprint, action to blacklist, whitelist, update the fingerprint database 115, etc. If warranted, based on a malicious classification, for example, the alert generator 560 can trigger an alert to stop execution of an associated application, etc.

Figure 6:
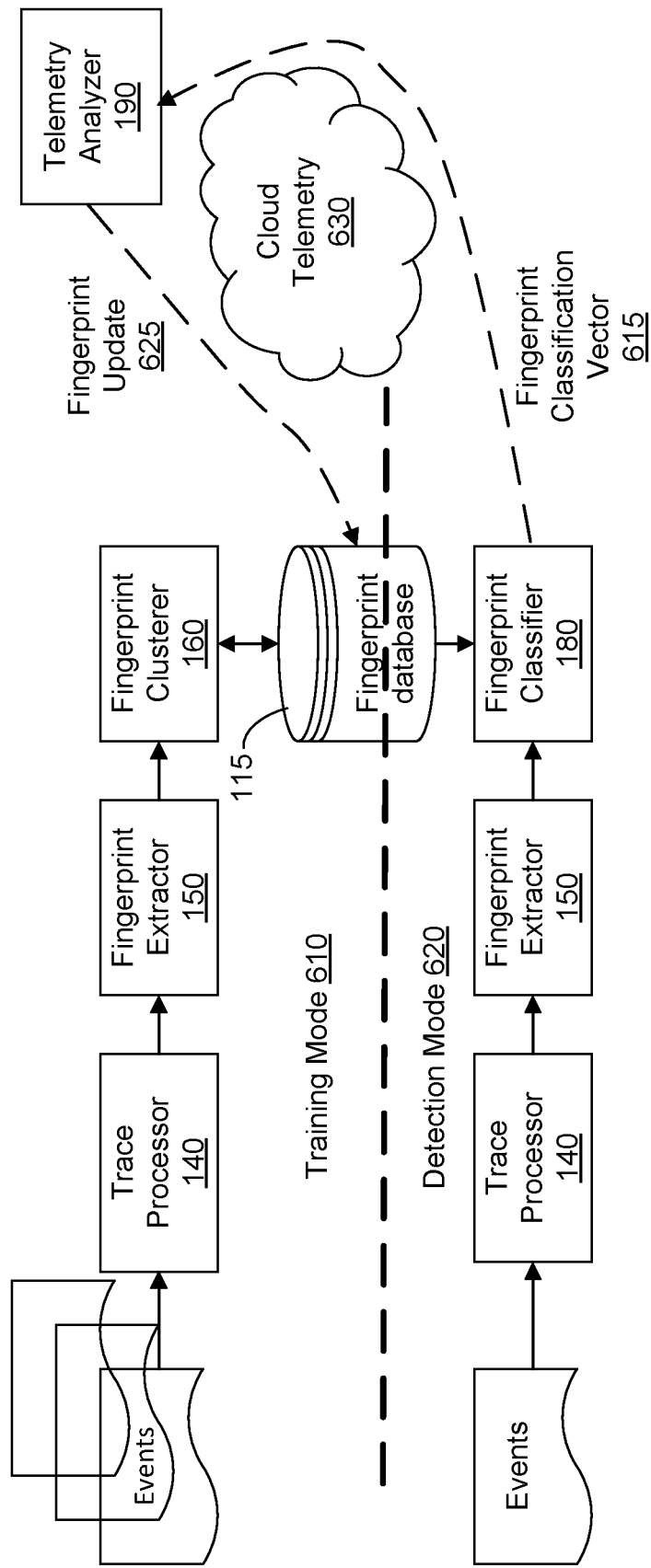
FIG. 6 illustrates an example control flow of the example system of FIG. 1 in a training mode and in a detection mode.

The example system 100 of FIGS. 1-5 can operate according to a plurality of modes or phases, for example. For example, the system 100 can operate in a training mode and in a detection mode. FIG. 6 illustrates an example control flow of the example system 100 in a training mode 610 and in a detection mode 620. In the training mode 610, the fingerprint database 115 of the memory 110 is constructed using the fingerprint clusterer 170 to enable identification, clustering, and/or other analysis of application/process fingerprints, for example. In the detection mode 620, the fingerprint classifier 180 leverages the fingerprint database 115 to classify fingerprints to blacklist and/or whitelist associated applications. In certain examples such as shown in FIG. 6, the telemetry analyzer 190 can leverage cloud-based telemetry information to verify a fingerprint classification vector 615 from the fingerprint classifier 180 and can provide a fingerprint update 625 to the fingerprint database 115 via a cloud telemetry network 630.

More specifically, as shown in the example of FIG. 6, during the training mode 610, CPU and OS events from one or more known applications are processed by the trace processor 140. The trace processor 140 captures cross-sectional jumps in code (e.g., based on target address, etc.), obfuscated or hidden code, DLL loading, remote thread injection, API calls/jumps, JIT and/or shell code execution, etc., to formulate process trace information for fingerprint analysis. The fingerprint extractor 150 generates histograms of the process trace information as well as available PMU counter(s) to form a process/application fingerprint. The fingerprint clusterer 170 groups or cluster fingerprints based on one or more similarity measurements such as Jaccard distance, Hamming distance, Euclidean distance, Cosine similarity, etc. Fingerprint clusters are stored in the fingerprint database 115 of the memory 110. For example, for a given cluster, a cluster centroid, cluster size, cluster diameter, cluster classification, etc., are stored with the fingerprint cluster in the fingerprint database 115. Thus, the fingerprint clusterer 170 learns as it processes more fingerprints, and the fingerprint database 115 becomes more robust with more fingerprints, fingerprint clusters, and associated classification information, for example.

In the detection mode 620, CPU and OS events from one or more unknown applications are processed by the trace processor 140. The trace processor 140 captures cross-sectional jumps in code (e.g., based on target address, etc.), obfuscated or hidden code, DLL loading, remote thread injection, API calls/jumps, JIT and/or shell code execution, etc., to formulate process trace information for fingerprint analysis. The fingerprint extractor 150 generates histograms of the process trace information as well as available PMU counter(s) to form a process/application fingerprint. The fingerprint classifier 180 compares the fingerprint to one or more cluster prototypes stored in the fingerprint database 115 of the memory 110. Distance(s) between a fingerprint and one or more fingerprint clusters can be formed into a classification vector 615 used to classify the fingerprint as malicious or benign based on the classification of the closest cluster(s), for example. In certain examples, the fingerprint classification vector is provided with other vectors as cloud telemetry information to the telemetry analyzer 190 in a secure cloud. The telemetry analyzer 190 learns from multiple fingerprint analyses via the cloud telemetry network 630 and can add, correct, remove, and/or otherwise update 625 fingerprint clustering and/or classification in the fingerprint database 115 in a loop of ongoing machine learning, for example.

In some examples, the training mode 610 can be triggered when a threshold amount of feedback is collected, indicating that the fingerprint database 115 and associated clustering/classification should be refreshed and redeployed for the detection mode 620. In other examples, the training mode 610 executes in parallel with the detection mode 620, and update of the fingerprint database 115 is dynamic and ongoing without transition between modes 610, 620 to replace and redeploy model(s) in the fingerprint database 115.

While example manners of implementing the example system 100 are illustrated in FIG. 1, one or more of the elements, processes, and/or devices illustrated in FIG. 1 may be combined, divided, re-arranged, omitted, eliminated, and/or implemented in any other way. Further, the example communication interface 105, the example memory 110, the example fingerprint database 115, the example fingerprint processor 120, the example telemetry analyzer 130, the example trace processor 140, the example fingerprint extractor 150, the example fingerprint analyzer 160, the example fingerprint clusterer 170, the example fingerprint classifier 180, the example telemetry analyzer 190, the example histogram extractor 220, the example N-gram sequencer 230, the example histogram extractor 240, the example fingerprint generator 250, the example histogram similarity measurer 320, the example cluster distance measurer 410, the example similarity analyzer 420, the example next level classifier 430, the example communication interface 510, the example classification vector processor 520, the example crowd telemetry aggregator 530, the example artificial intelligence model(s) 540, the example fingerprint labeler 550, the example alert generator 560, the example cloud telemetry network 630, and/or, more generally, the example system 100 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example communication interface 105, the example memory 110, the example fingerprint database 115, the example fingerprint processor 120, the example telemetry analyzer 130, the example trace processor 140, the example fingerprint extractor 150, the example fingerprint analyzer 160, the example fingerprint clusterer 170, the example fingerprint classifier 180, the example telemetry analyzer 190, the example histogram extractor 220, the example N-gram sequencer 230, the example histogram extractor 240, the example fingerprint generator 250, the example histogram similarity measurer 320, the example cluster distance measurer 410, the example similarity analyzer 420, the example next level classifier 430, the example communication interface 510, the example classification vector processor 520, the example crowd telemetry aggregator 530, the example artificial intelligence model(s) 540, the example fingerprint labeler 550, the example alert generator 560, the example cloud telemetry network 630, and/or, more generally, the example system 100 are hereby expressly defined to include a non-transitory computer readable storage device or storage disk such as a memory, a digital versatile disk (DVD), a compact disk (CD), a Blu-ray disk, etc. including the software and/or firmware. Further still, the example communication interface 105, the example memory 110, the example fingerprint database 115, the example fingerprint processor 120, the example telemetry analyzer 130, the example trace processor 140, the example fingerprint extractor 150, the example fingerprint analyzer 160, the example fingerprint clusterer 170, the example fingerprint classifier 180, the example telemetry analyzer 190, the example histogram extractor 220, the example N-gram sequencer 230, the example histogram extractor 240, the example fingerprint generator 250, the example histogram similarity measurer 320, the example cluster distance measurer 410, the example similarity analyzer 420, the example next level classifier 430, the example communication interface 510, the example classification vector processor 520, the example crowd telemetry aggregator 530, the example artificial intelligence model(s) 540, the example fingerprint labeler 550, the example alert generator 560, the example cloud telemetry network 630, and/or, more generally, the example system 100 of FIG. 1 may include one or more elements, processes, and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
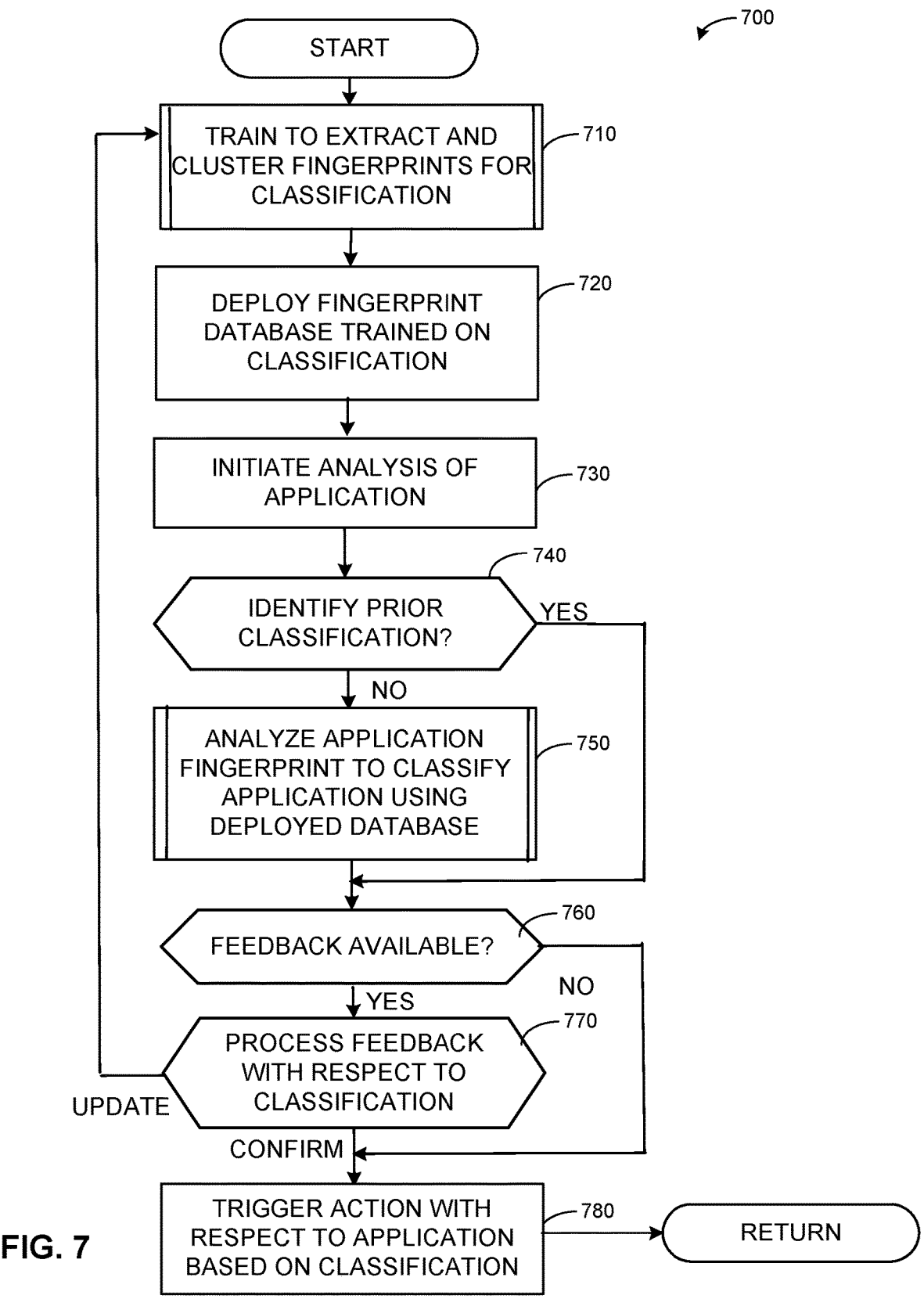
FIGS. 7-11 are flowcharts representative of machine readable instructions which may be executed to implement the example system of FIG. 1.

A flowchart representative of example hardware logic, machine readable instructions, hardware implemented state machines, and/or any combination thereof for implementing the example system 100 of FIG. 1 is shown in FIG. 7. The machine readable instructions may be one or more executable programs or portion(s) of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware.

Further, although the example program is described with reference to the flowchart illustrated in FIG. 7, many other methods of implementing the example system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device, and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 7-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects, and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 7 illustrates a process or method 700 implemented by executing program instructions to drive the example system 100 to evaluate an application, determine the application's fingerprint, and classify the application as benign or malicious using the fingerprint. The example program 700 includes training the example system 100 to extract and cluster fingerprints to classify associated applications (block 710). For example, the system 100 can be trained (e.g., the fingerprint database 115 can be populated, etc.) by analyzing processor trace and PMU counter events from application execution to extract a fingerprint based on histogram extractions from the trace and PMU events and cluster fingerprints around a criterion such as malicious or benign. Similar fingerprints sharing a classification (e.g., malicious or benign, etc.) can be clustered and stored in the fingerprint database 115 for evaluation of future application fingerprints, for example.

Once trained, the system 100 is deployed with the fingerprint database 115 to classify applications attempting to execute on a computing device (block 720). In certain examples, the training mode 610 and detection mode 620 may be continuous and dynamic such that there is no formal deployment of the database 115 to trigger activation of the detection mode 620. However, in other examples, the detection mode 620 is triggered when the fingerprint database 115 is sufficiently populated with accurately clustered and classified fingerprints as verified by the telemetry analyzer 190.

The example program 700 includes detecting a new application execution trigger and initiating analysis of the application (block 730). For example, the launch of computer program code related to an application that has not yet been classified triggers fingerprint extraction and classification using the system 100. The program 700 can determine whether or not the application has already been classified by querying the fingerprint database 115 for the application name and/or application fingerprint (block 740). If the application is identified in the database 115, then the application has already been classified and can be handled accordingly. For example, if the application was previously found to be benign, then the application is allowed to execute. However, if the application was previously found to be malicious, then execution of the application is blocked, for example. In certain examples, the particular application fingerprint is compared to the fingerprint database 115 because a previously benign application could have been modified by a virus to become malicious. Such alteration can be identified in the fingerprint, for example.

If no prior classification exists, then an application fingerprint is analyzed to classify the application as malicious or benign (block 750). For example, software and hardware telemetry information is processed, and a fingerprint is extracted for the application. That application fingerprint is then classified by comparing the fingerprint to clusters of fingerprints stored in the database 115, for example. For example, one or more distance and/or similarity measures, such as Jaccard distance, Hamming distance, Euclidean distance, Cosine similarity, etc., can be used to determine a distance (e.g., indicating a matching or similarity, etc.) between the application fingerprint and fingerprint clusters stored in the database 115. By determining whether the application fingerprint under review is similar to a cluster of fingerprints already classified as benign or malicious (e.g., fitting within the bounds of the cluster, falling within a tolerance or standard deviation of the clustered fingerprint values, etc.), the application under review can be classified as benign or malicious, for example.

The example program 700 includes determining whether feedback is available regarding fingerprint/application classification (block 760). If feedback is available, then that feedback is processed with respect to the application/fingerprint classification (block 770). If analysis of feedback indicates that an application's classification should be changed, then the example program 700 includes updating fingerprint information used to classify application fingerprints based on a change in the classification of the application (block 710). For example, if a plurality of systems, gathered by cloud telemetry and analyzed by the telemetry analyzer 190, determine that an application is malicious when the fingerprint classifier 180 had classified the application fingerprint as benign, then the classification of the application and its fingerprint can be updated/retrained in the fingerprint database 115 as malicious, or vice versa (block 710).

The example program 700 includes triggering an action (e.g., a remedial action, etc.) with respect to the application based on the classification associated with the application and/or its fingerprint (block 780). For example, execution of the application can be allowed if the fingerprint was classified as benign. However, execution of the application can be blocked, the application can be quarantined, the application can be further evaluated, and/or other remedial action, etc., if the application fingerprint was classified as malicious, for example.

Figure 8:
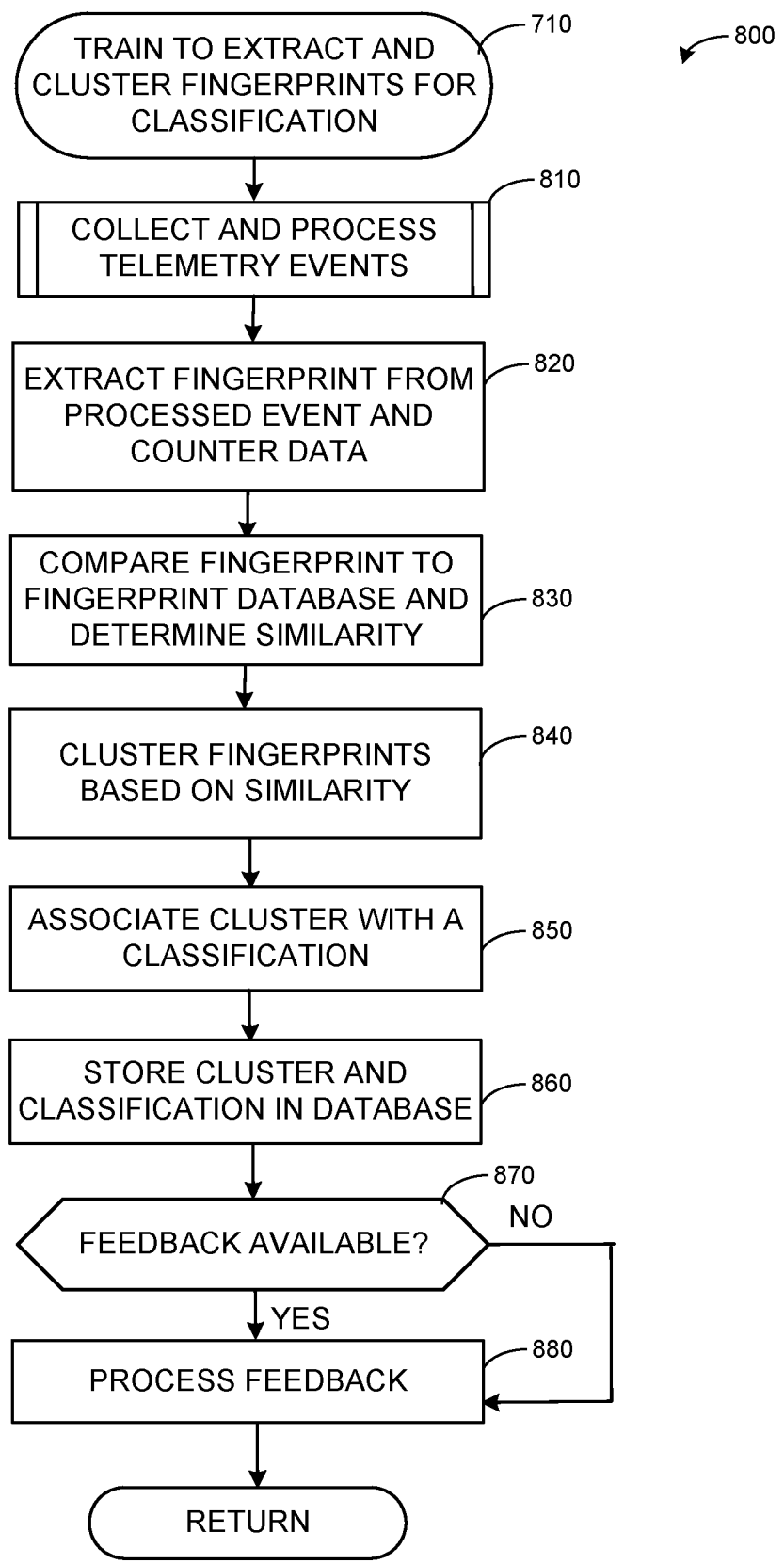

FIG. 8 illustrates an example program 800 to train the example system 100 to extract and cluster fingerprints to classify associated applications (e.g., an example implementation of block 710 of the example of FIG. 7). In the training mode 610, hardware (e.g., CPU, other processor, etc.) and software (e.g., OS, other applications, etc.) telemetry events associated with execution of known applications are collected by the telemetry collector 130 and processed by the trace processor 140 (block 810). For example, the trace processor 140 captures cross-sectional jumps in code (e.g., based on target address, etc.), obfuscated or hidden code, DLL loading, remote thread injection, API calls/jumps, JIT and/or shell code execution, etc., to formulate process trace information for fingerprint analysis.

Figure 9:
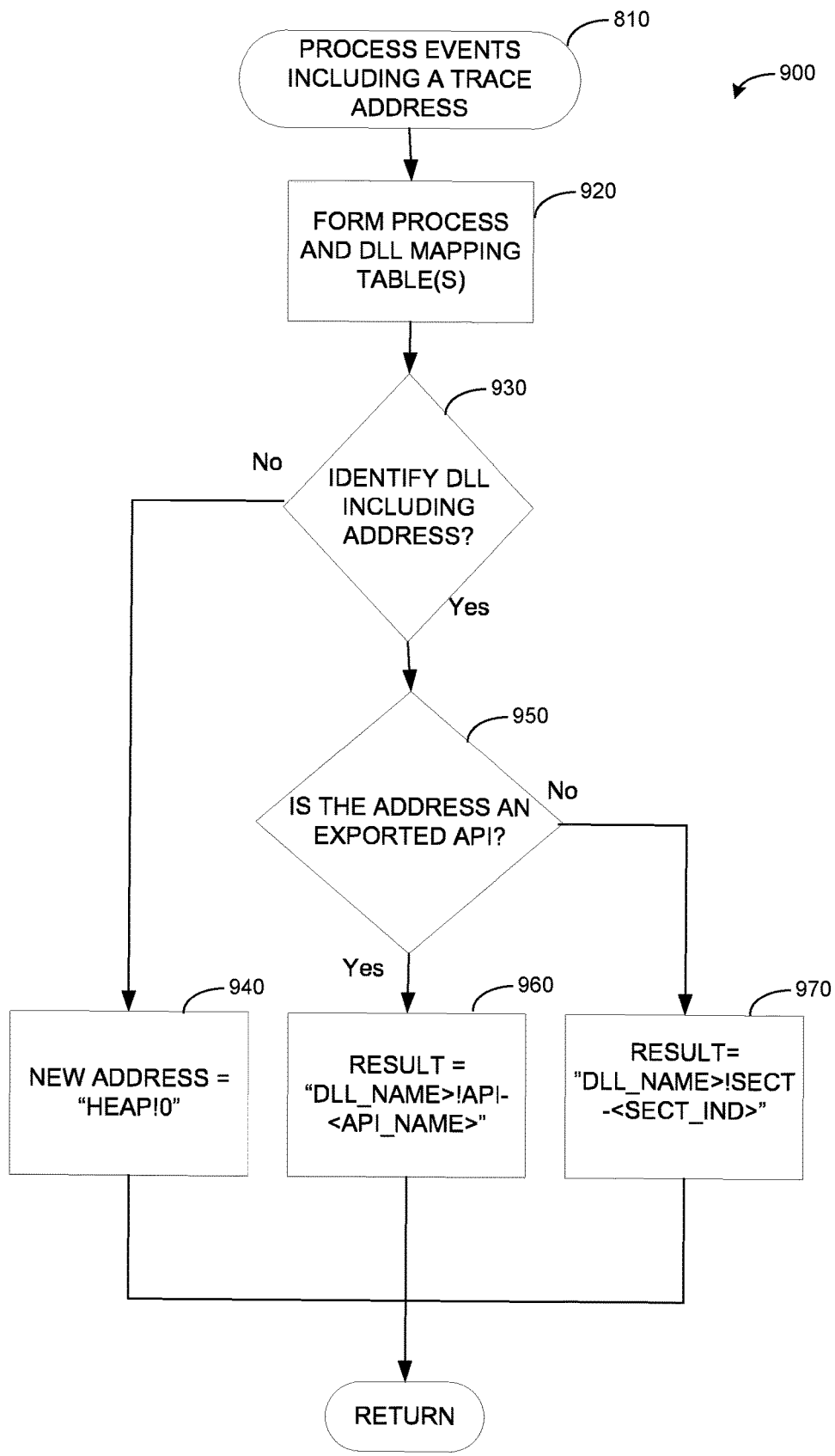

For example, FIG. 9 illustrates an example of telemetry trace event processing (block 810) by encoding addresses of target sections or points in the application's address space to which control transfer is to be recorded for further analysis. The address encoding can form part of the trace processing of block 810, for example. Using the program 900, the trace processor 140 begins processing an address of a process trace (PT) (block 910). The trace processor 140 receives OS process and DLL events, which form process and DLL mapping table(s) (block 920).

The trace processor 140 queries the table(s) to identify a DLL that includes the address (block 930). If a DLL is not identified, then the trace processor 140 sets a new address, such as "heap!0" (block 940). If a DLL is identified, the trace processor 140 determines whether the address is an exported application programming interface (API) (block 950). If the address is an exported API, then the trace processor 140 provides a query result of "DLL_NAME>!API-<API_NAME" (block 960). However, if the address is not an exported API, then the trace processor 140 provides a query result of "DLL_NAME>!SECT-<SECT_IND>" (block 970). As such, the trace processor 140 can identify, categorize, and catalog target addresses for analysis of program execution and formation of fingerprints, for example.

A fingerprint for the application is extracted by the fingerprint extractor 150 using the processed telemetry event data and PMU counter information (block 820). For example, histograms of PMU counter data and one or more N-gram sets of processed trace data from the trace processor 140 are combined to form into an application fingerprint in which the set of histograms characterize the application as its fingerprint.

The fingerprint is compared by the fingerprint analyzer 160 to one or more known fingerprints (e.g., ground truth data) stored in the database 115 to measure similarity between the fingerprint histograms (block 830). For example, one or more distance metrics such as a Jaccard distance, Hamming distance, Euclidean distance, Cosine similarity, etc., can be used to measure similarity between two histograms associated with application fingerprints. In certain examples, when comparing two fingerprints, a fingerprint similarity feature vector is created in which each field of the vector corresponds to a distance metric between matching histograms in the two fingerprints.

Fingerprints can then be clustered by the fingerprint clusterer 170 based on their similarity (block 840). For example, fingerprints with values within a certain distance or diameter of a centroid value are clustered together. The clustered fingerprints are associated with a classification (block 850). For example, since the application is known, the application is known to be malicious or benign, and the cluster of similar fingerprints can be associated with the same classification. The cluster of fingerprints and associated information (e.g., classification, centroid, size, diameter, etc.) are stored by the fingerprint clusterer 170 in the fingerprint database 115 to classify additional applications and associated fingerprints (block 860). Thus, known fingerprints and fingerprints generated from known, classified applications can be used to train and build the fingerprint database 115 through clusters of application/process fingerprints for comparison to new, unknown applications and/or other processes that seek to execute on the system.

In certain examples, the fingerprint clusterer 170 learns or is trained to cluster fingerprints using unsupervised learning with unlabeled samples from a same program family. Such one-class training with known results can be used to train the fingerprint clusterer 170 to identify similar fingerprints that should be clustered and classified together, for example. Alternatively, a neural network can be used in supervised learning with labeled samples from a plurality of classes.

In certain examples, learning is continuous to update the fingerprint database 115. If feedback is available (block 870), then the feedback is processed (block 880). An update from the telemetry analyzer 190 can trigger an update of the fingerprint database 115 to adjust the fingerprint clustering, classification of a fingerprint, etc., for example. The fingerprint database 115 is then ready to be deployed and/or otherwise used to classify new fingerprints for unclassified applications, for example.

Figure 10:
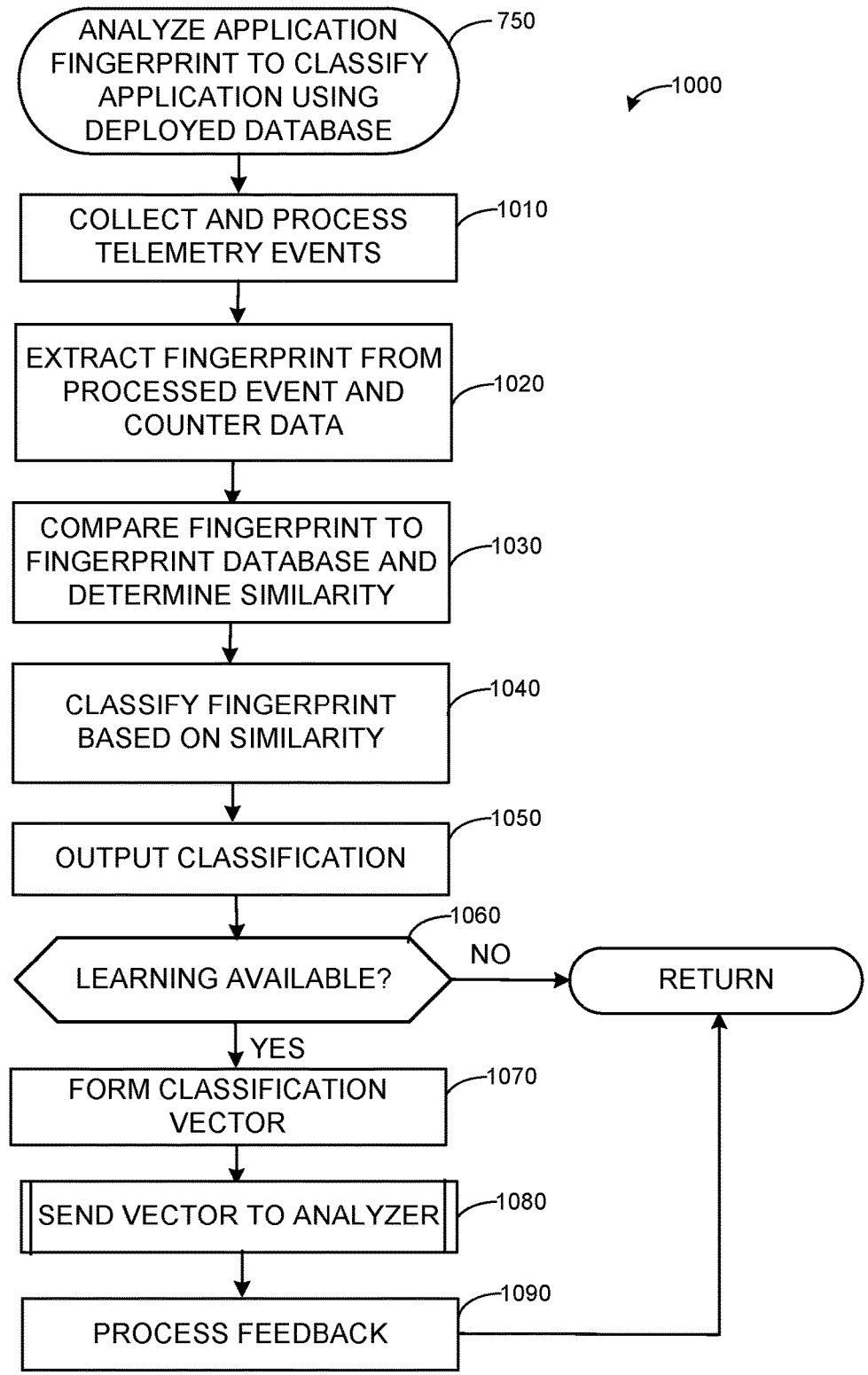

FIG. 10 illustrates an example program 1000 to detect a new application execution trigger and analyze a fingerprint of the application to classify the application as malicious or benign (e.g., an example implementation of block 750 of the example of FIG. 7). In the detection mode 620, hardware (e.g., CPU, other processor, etc.) and software (e.g., OS, other applications, etc.) telemetry events associated with execution of unknown applications are collected by the telemetry collector 130 and processed by the trace processor 140 (block 1010). For example, the trace processor 140 captures cross-sectional jumps in code (e.g., based on target address, etc.), obfuscated or hidden code, DLL loading, remote thread injection, API calls/jumps, JIT and/or shell code execution, etc., to formulate process trace information for fingerprint analysis. For example, FIG. 9 illustrates an example of telemetry trace event processing by encoding addresses of target sections or points in the application's address space to which control transfer is to be recorded.

A fingerprint for the application is extracted by the fingerprint extractor 150 using the processed telemetry event data and PMU counter information (block 1020). For example, histograms of PMU counter data and one or more N-gram sets of processed trace data from the trace processor 140 are formed into an application fingerprint.

The fingerprint is compared by the fingerprint analyzer 160 to one or more fingerprints stored in the database 115 to measure similarity between the fingerprint histograms (block 1030). For example, one or more distance metrics such as a Jaccard distance, Hamming distance, Euclidean distance, Cosine similarity, etc., can be used to measure similarity between two histograms associated with application fingerprints. In certain examples, when comparing two fingerprints, a fingerprint similarity feature vector is created in which each field of the vector corresponds to a distance metric between matching histograms in the two fingerprints. The fingerprint classifier 180 leverages the similarity feature vector and content of the fingerprint database 115 to classify the fingerprint and/or its associated application based on identified cluster(s) to which the particular fingerprint is similar, such as within a similarity threshold distance determined using the one or more distance metrics, etc. (block 1040). A classification associated with the closest fingerprint cluster is assigned to the application fingerprint being analyzed and output to allow antivirus and/or antimalware software, the OS, the CPU and/or other processor, and/or other application (e.g., Basic Input/Output System (BIOS), firewall, etc.) to handle the application accordingly (e.g., to blacklist the application and/or the application fingerprint and not allow the application to execute, to whitelist the application and/or the application fingerprint and allow the application to execute, to quarantine the application, to trigger further review of the application and/or application fingerprint, etc.) (block 1050).

In certain examples, learning is continuous to update the fingerprint database 115. If a connection to the telemetry analyzer 190 is available (block 960), then a fingerprint classification vector is formed (block 1070) by the fingerprint classifier 180 and sent to the telemetry analyzer 190 for cloud-based and/or other cumulative telemetry analysis (block 1080). The fingerprint classification vector encodes distances between the fingerprint being analyzed and one or more closest/most similar clusters from the fingerprint database 115. As such, classifications of the same application/application fingerprint can be compared by the telemetry analyzer 190 to determine a group or aggregate classification for the application fingerprint in question. Feedback adjusting content of the fingerprint database 115 (e.g., in clustering, classification, etc.) can be sent to the database 115 from the telemetry analyzer 190 (block 1090), for example.

Figure 11:
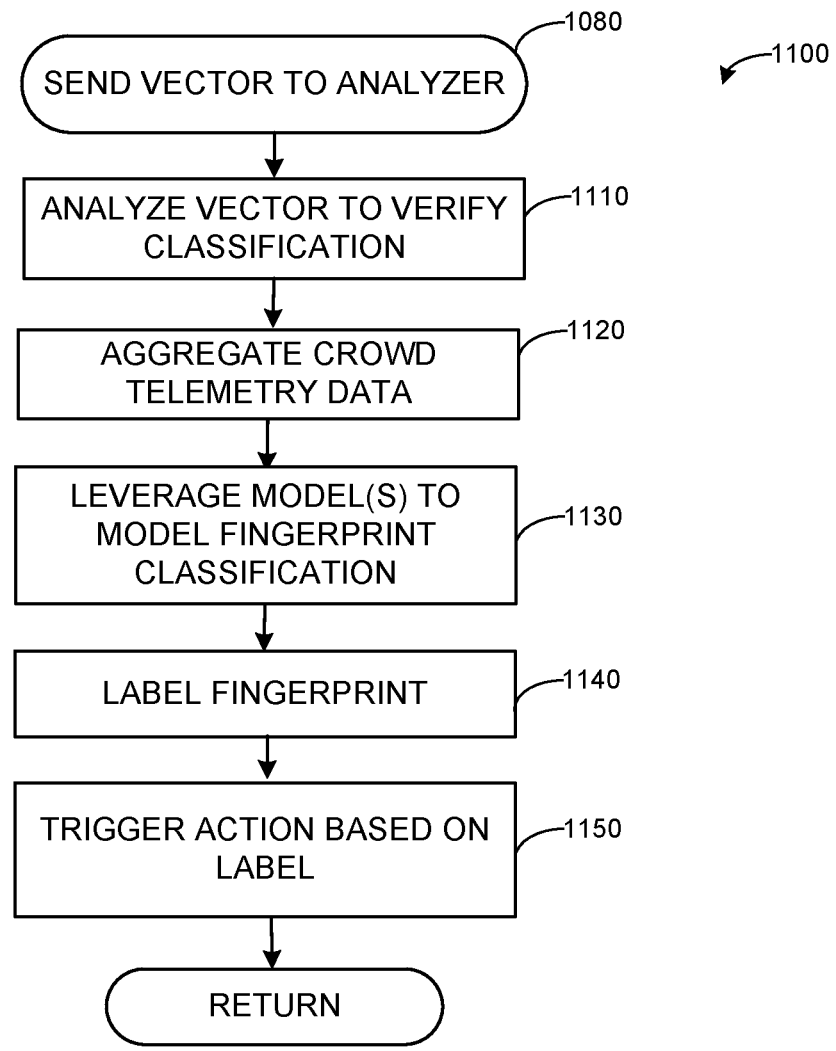

FIG. 11 an example program 1100 to analyze a fingerprint classification vector (e.g., an example implementation of block 1080 of the example of FIG. 10). When the telemetry analyzer 190 receives an input classification vector for cloud- and/or other crowd-based analysis from the fingerprint classifier 180, the classification vector processor 520 analyzes the fingerprint classification vector to verify the classification determined by the fingerprint classifier 180 (block 1110). The crowd telemetry aggregator 530 gathers telemetry information from a plurality of systems exposed to same or similar fingerprints (block 1120). The classification vector processor 520 can train and deploy and/or otherwise leverage artificial intelligence model(s) 540 to model fingerprint classifications based on the crowd telemetry and apply the classification to the input vector (block 1130). The fingerprint labeler 550 can then label and/or confirm a labeling of the fingerprint and/or fingerprint class associated with the fingerprint classification vector as benign, malicious, etc. (block 1140). The alert generator 560 can trigger, based on the labeling of the fingerprint, action to blacklist, whitelist, update the fingerprint database 115, stop execution of an associated application, etc. (block 1150).

Figure 12:
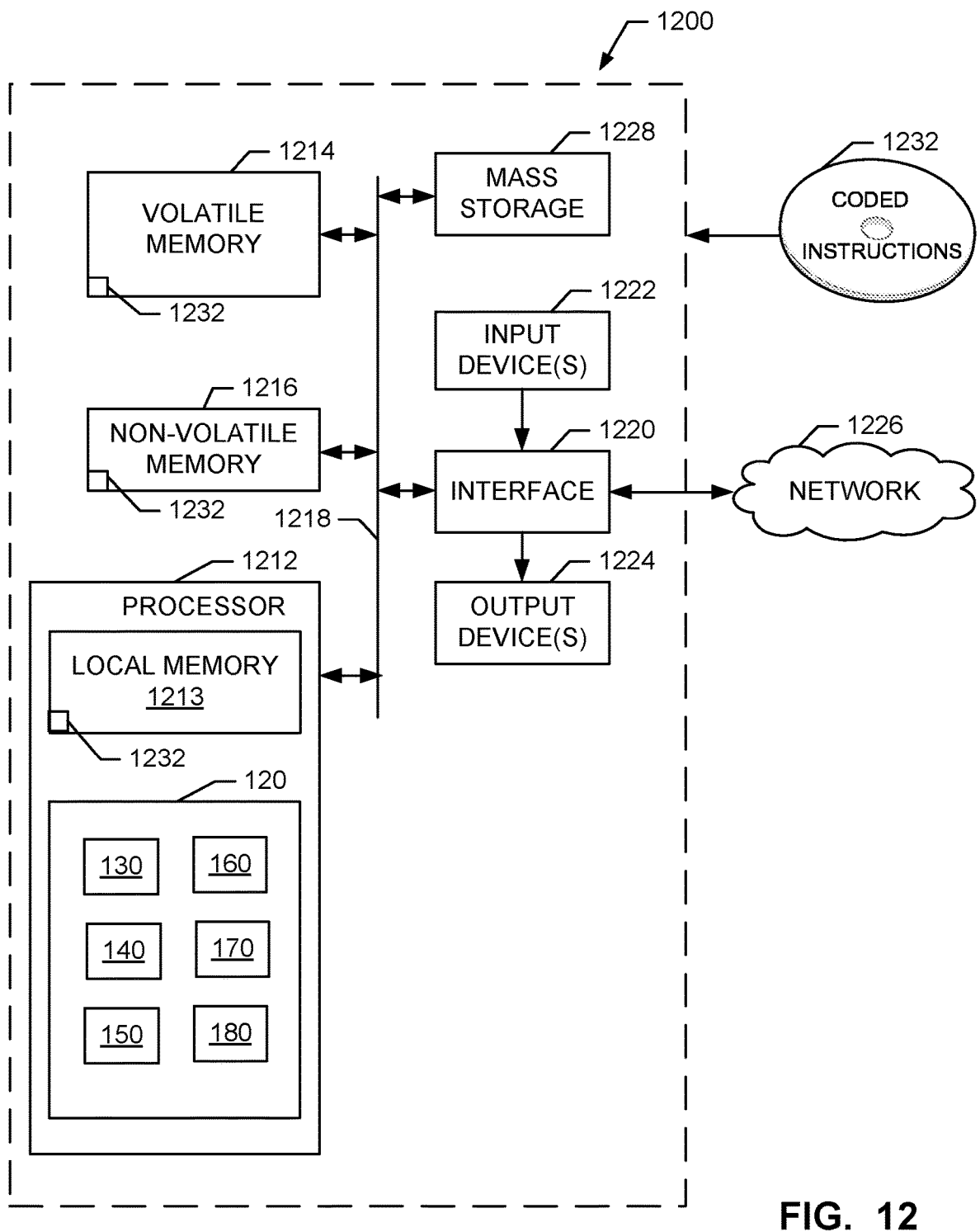
FIG. 12 is a block diagram of an example processing platform structured to execute the instructions of FIGS. 7-11 to implement the example application classification system of FIG. 1.

FIG. 12 is a block diagram of an example processor platform 1200 structured to execute the instructions of FIG. 7 to implement the example system 100 of FIG. 1. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs (including GPU hardware), DSPs, or controllers from any desired family or manufacturer. The hardware processor may be a semiconductor based (e.g., silicon based) device. In this example, the processor 1212 implements the example fingerprint processor 120, the example telemetry collector 130, the example trace processor 140, the example fingerprint extractor 150, the example fingerprint analyzer 160, the example fingerprint clusterer 170, and the example fingerprint classifier 180.

The processor 1212 of the illustrated example includes a local memory 1213 (e.g., a cache, memory 110, etc.). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1216 may be implemented by flash memory and/or any other desired type of memory device. Access to the main memory 1214, 1216, which can also be used to implement memory 110, is controlled by a memory controller.

The processor platform 1200 of the illustrated example also includes an interface circuit 1220 (e.g., the communication interface 105). The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 1220 of the illustrated example, thus, typically includes a graphics driver card, a graphics driver chip, and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIG. 7 may be stored in the mass storage device 1228, in the volatile memory 1214, in the non-volatile memory 1216, and/or on a removable non-transitory computer readable storage medium such as a CD or DVD.

Figure 13:
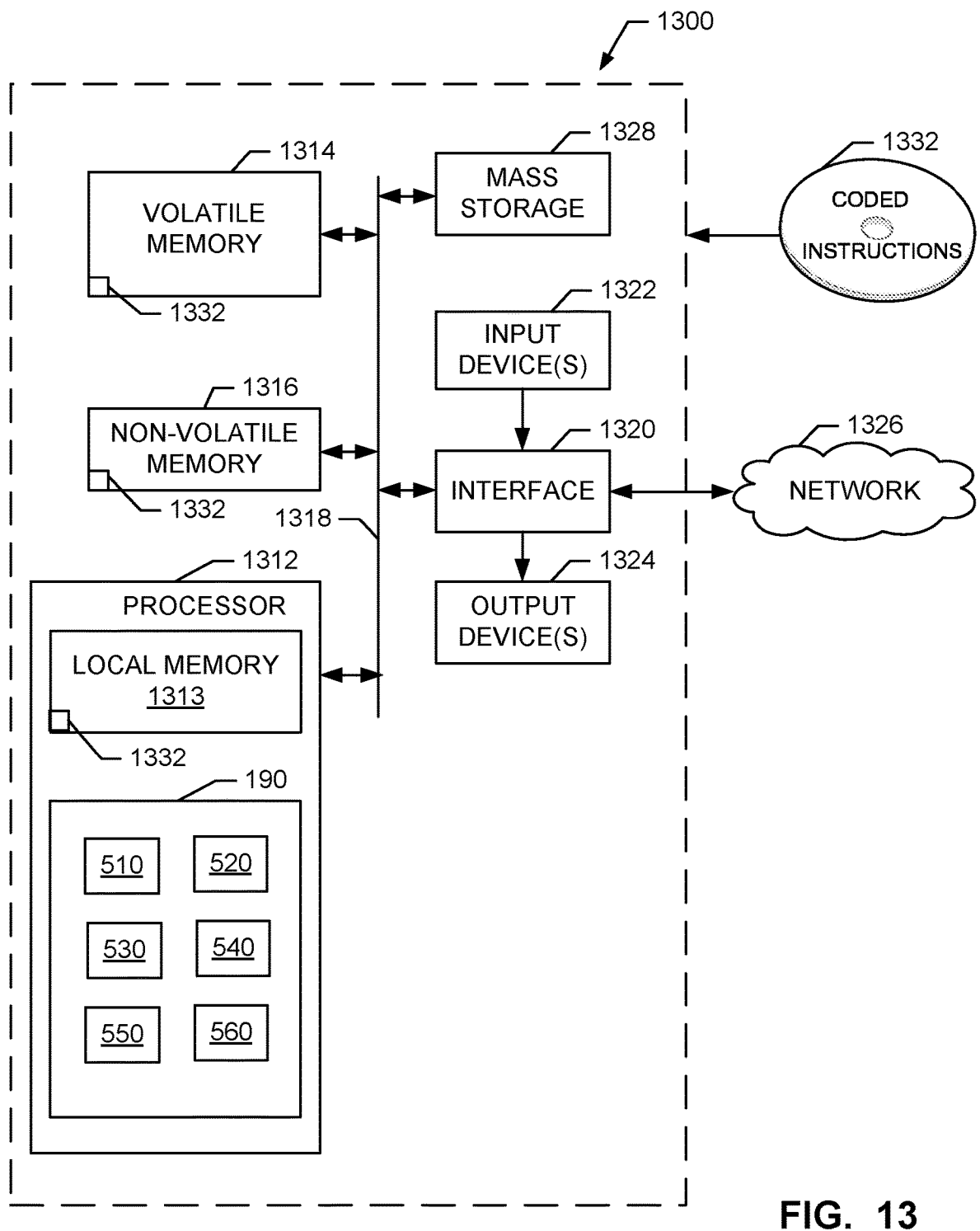
FIG. 13 is a block diagram of an example processing platform structured to execute the instructions of FIGS. 7-11 to implement the example telemetry analyzer of FIG. 1.

FIG. 13 is a block diagram of an example processor platform 1300 structured to execute the instructions of FIG. 7 to implement the telemetry analyzer 190 of FIG. 1. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1312 implements the telemetry analyzer 190 including the example communication interface 510, the example classification vector processor 520, the example crowd telemetry aggregator 530, the example artificial intelligence model(s) 540, the example fingerprint labeler 550, and the example alert generator 560.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by SDRAM, DRAM, RDRAM®, and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320 (e.g., the communication interface 510, etc.). The interface circuit 1320 may be implemented by any type of interface standard, such as an Ethernet interface, a USB, a Bluetooth® interface, an NFC interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 1324 are also connected to the interface circuit 1320 of the illustrated example. The output devices 1324 can be implemented, for example, by display devices (e.g., an LED, an OLED, an LCD, a CRT display, an IPS display, a touchscreen, etc.), a tactile output device, a printer, and/or speaker. The interface circuit 1320 of the illustrated example, thus, typically includes a graphics driver card, a graphics driver chip, and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a DSL connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and DVD drives.

The machine executable instructions 1332 of FIG. 7 may be stored in the mass storage device 1328, in the volatile memory 1314, in the non-volatile memory 1316, and/or on a removable non-transitory computer readable storage medium such as a CD or DVD.

From the foregoing, it will be appreciated that example systems, apparatus, devices, methods, and articles of manufacture have been disclosed that enable a processor to determine an application's fingerprint and to classify that application by its fingerprint. Disclosed systems, apparatus, devices, methods, and articles of manufacture improve the efficiency of using a computing device by enabling computers of any manufacture or model to capture and process hardware and software telemetry events to transform the events into a fingerprint representative of application execution flow and classify the application as a benign, allowable application or a malicious, harmful application to be regulated accordingly. The disclosed methods, apparatus, systems, and articles of manufacture are accordingly directed to one or more improvement(s) in the functioning of a computer.

Examples disclosed herein capture processor trace information to profile branch execution flow directly from the CPU and/or other system processor. Examples disclosed herein create a model to fingerprint a software application cluster or family and use the fingerprint to detect a new software update or modification that may deviate from the prior fingerprint. Examples disclosed herein utilize unsupervised machine learning to construct a fingerprint database for analysis and create a feature vector from telemetry data coming out of the CPU to classify new CPU-driven application behavior based on fingerprints in the fingerprint database.

Descriptors "first," "second," "third," etc. are used herein when identifying multiple elements or components which may be referred to separately. Unless otherwise specified or understood based on their context of use, such descriptors are not intended to impute any meaning of priority, physical order, arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Disclosed herein is an apparatus including a trace processor to process events in a processor trace to capture application execution behavior corresponding to processor control flow associated with the events. The example apparatus includes a fingerprint extractor to extract a first fingerprint from the captured application execution behavior and performance monitor information. The example apparatus includes a fingerprint clusterer to, in a training mode, when the first fingerprint and a second fingerprint are compared and determined to be within a similarity threshold based on a distance metric, cluster the first fingerprint and the second fingerprint into a cluster of fingerprints to be stored in a fingerprint database with a classification. The example apparatus includes a fingerprint classifier to, in a deployed mode, classify a third fingerprint, the fingerprint classifier to classify the third fingerprint with the classification associated with the cluster of fingerprints when a comparison of the third fingerprint to the cluster of fingerprints from the fingerprint database using the distance metric is within the similarity threshold, the fingerprint classifier to trigger a remedial action when the classification is malicious.

In some examples, the captured application execution behavior includes i) target address information including points of control transfer within the application's address space, and ii) application programming interface (API) call sequences. In some examples, the captured application execution behavior further includes at least one of dynamic linked library execution, just in time code execution, or shell code execution.

In some examples, the performance monitor information includes performance monitor unit counter values.

In some examples, the fingerprint extractor is to calculate a first histogram of the captured application execution behavior and a second histogram of the performance monitor information and form the first fingerprint from the first histogram and the second histogram.

In some examples, the distance metric includes at least one of a Jaccard distance, a Hamming distance, a Euclidean distance, or a Cosine similarity.

In some examples, the apparatus further includes a telemetry analyzer to gather crowd telemetry from a plurality of systems to verify or change the classification. In some examples, the telemetry analyzer is to update the fingerprint database based on a change in the classification.

Disclosed herein is a non-transitory computer readable storage medium comprising computer readable instructions that, when executed, cause at least one processor to at least: process events in a processor trace to capture application execution behavior corresponding to processor control flow associated with the events; extract a first fingerprint from the captured application execution behavior and performance monitor information; in a training mode, when the first fingerprint and a second fingerprint are determined to be within a similarity threshold based on a distance metric, cluster the first fingerprint and the second fingerprint to form a cluster of fingerprints to be stored in a fingerprint database with a classification; in a deployed mode, classify a third fingerprint, the third fingerprint to be classified with the classification associated with the cluster of fingerprints when a comparison of the third fingerprint to the cluster of fingerprints from the fingerprint database using the distance metric is within the similarity threshold; and trigger a remedial action when the classification is malicious.

In some examples, the instructions, when executed, cause the at least one processor to capture application execution behavior including i) target address information including points of control transfer within the application's address space, and ii) application programming interface (API) call sequences.

In some examples, the instructions, when executed, cause the at least one processor to capture application execution behavior including at least one of dynamic linked library execution, just in time code execution, or shell code execution.

In some examples, the performance monitor information includes performance monitor unit counter values.

In some examples, the instructions, when executed, cause the at least one processor to calculate a first histogram of the captured application execution behavior and a second histogram of the performance monitor information and form the first fingerprint from the first histogram and the second histogram.

In some examples, the distance metric includes at least one of a Jaccard distance, a Hamming distance, a Euclidean distance, or a Cosine similarity.

In some examples, the instructions, when executed, cause the at least one processor to gather crowd telemetry from a plurality of systems to verify or change the classification. In some examples, the instructions, when executed, cause the at least one processor to update the fingerprint database based on a change in the classification.

Disclosed herein is a method including: processing, by executing an instruction with at least one processor, events for an application in a processor trace to capture application execution behavior corresponding to processor control flow associated with the events; extracting, by executing an instruction with the at least one processor, a first fingerprint from the captured application execution behavior and performance monitor information; in a training mode, when the first fingerprint and a second fingerprint are determined to be within a similarity threshold based on a distance metric, clustering, by executing an instruction with the at least one processor, the first fingerprint and the second fingerprint to form a cluster of fingerprints to be stored in a fingerprint database with a classification; in a deployed mode, classifying, by executing an instruction with the at least one processor, a third fingerprint, the third fingerprint to be classified with the classification associated with the cluster of fingerprints when a comparison of the third fingerprint to the cluster of fingerprints from the fingerprint database using the distance metric is within the similarity threshold; and triggering, by executing an instruction with the at least one processor, a remedial action when the classification is malicious.

In some examples, the method further includes capturing application execution behavior including i) target address information including points of control transfer within the application's address space, and ii) application programming interface (API) call sequences.

In some examples, the method further includes capturing application execution behavior including at least one of dynamic linked library execution, just in time code execution, or shell code execution.

In some examples, the performance monitor information includes performance monitor unit counter values.

In some examples, the method further includes calculating a first histogram of the captured application execution behavior and a second histogram of the performance monitor information and forming the first fingerprint from the first histogram and the second histogram.

In some examples, the distance metric includes at least one of a Jaccard distance, a Hamming distance, a Euclidean distance, or a Cosine similarity.

In some examples, the method further includes gathering crowd telemetry from a plurality of systems to verify or change the classification. In some examples, the method further includes updating the fingerprint database based on a change in the classification.

Disclosed herein is an apparatus including memory including machine reachable instructions; and at least one processor to execute the instructions to: process events for an application in a processor trace to capture application execution behavior corresponding to processor control flow associated with the events; extract a first fingerprint from the captured application execution behavior and performance monitor information; in a training mode, when the first fingerprint and a second fingerprint are determined to be within a similarity threshold based on a distance metric, cluster the first fingerprint and the second fingerprint to be stored in a fingerprint database with a classification; in a deployed mode, classify a third fingerprint, the third fingerprint to be classified with the classification associated with the cluster of fingerprints when a comparison of the third fingerprint to the cluster of fingerprints from the fingerprint database using the distance metric is within the similarity threshold; and trigger a remedial action when the classification is malicious.

In some examples, the at least one processor is to capture application execution behavior including i) target address information including points of control transfer within the application's address space, and ii) application programming interface (API) call sequences.

In some examples, the at least one processor is to capture application execution behavior including at least one of dynamic linked library execution, just in time code execution, or shell code execution.

In some examples, the performance monitor information includes performance monitor unit counter values.

In some examples, the at least one processor is to calculate a first histogram of the captured application execution behavior and a second histogram of the performance monitor information and form the first fingerprint from the first histogram and the second histogram.

In some examples, the distance metric includes at least one of a Jaccard distance, a Hamming distance, a Euclidean distance, or a Cosine similarity.

In some examples, the at least one processor is to gather crowd telemetry from a plurality of systems to verify or change the classification.

In some examples, the at least one processor is to update the fingerprint database based on a change in the classification.

Disclosed herein is an apparatus including: means for processing events in a processor trace to capture application execution behavior corresponding to processor control flow associated with the events; means for extracting a first fingerprint from the captured application execution behavior and performance monitor information; means for clustering, in a training mode when the first fingerprint and a second fingerprint are compared and determined to be within a similarity threshold based on a distance metric, the first fingerprint and the second fingerprint to form a cluster of fingerprints to be stored in a fingerprint database with a classification; and means for classifying, in a deployed mode, a third fingerprint, the fingerprint classifier to classify the third fingerprint with the classification associated with the cluster of fingerprints when a comparison of the third fingerprint to the cluster of fingerprints from the fingerprint database using the distance metric is within the similarity threshold, the means for classifying to trigger a remedial action when the classification is malicious.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. An apparatus comprising:
a trace processor circuit to process hardware and software telemetry events in a processor trace to capture application execution behavior corresponding to processor control flow associated with the events;
a fingerprint extractor circuit to extract a first fingerprint from the captured application execution behavior and performance monitor information, wherein the fingerprint extractor circuit is to calculate a first histogram of the captured application execution behavior and a second histogram of the performance monitor information and form the first fingerprint from the first histogram and the second histogram;
a fingerprint clusterer circuit to, in a training mode, when the first fingerprint and a second fingerprint are compared and determined to be within a similarity threshold based on a distance metric, group the first fingerprint and the second fingerprint into a cluster of fingerprints to be stored in a fingerprint database with a classification; and
a fingerprint classifier circuit to, in a deployed mode, classify a third fingerprint, the fingerprint classifier to classify the third fingerprint with the classification associated with the cluster of fingerprints when a comparison of the third fingerprint to the cluster of fingerprints from the fingerprint database using the distance metric is within the similarity threshold, the fingerprint classifier to trigger a remedial action when the classification is malicious.

2. The apparatus of claim 1, wherein the captured application execution behavior includes i) target address information including points of control transfer within an address space of an application, and ii) application programming interface (API) call sequences.

3. The apparatus of claim 2, wherein the captured application execution behavior further includes at least one of dynamic linked library execution, just in time code execution, or shell code execution.

4. The apparatus of claim 1, wherein the performance monitor information includes performance monitor unit counter values.

5. The apparatus of claim 1, wherein the distance metric includes at least one of a Jaccard distance, a Hamming distance, a Euclidean distance, or a Cosine similarity.

6. The apparatus of claim 1, further including a telemetry analyzer circuit to gather crowd telemetry from a plurality of systems to verify or change the classification.

7. The apparatus of claim 6, wherein the telemetry analyzer circuit is to update the fingerprint database based on a change in the classification.

8. A non-transitory computer readable storage medium comprising computer readable instructions that, when executed, cause at least one processor to at least:
process hardware and software telemetry events in a processor trace to capture application execution behavior corresponding to processor control flow associated with the events;
extract a first fingerprint from the captured application execution behavior and performance monitor information by at least calculating a first histogram of the captured application execution behavior and a second histogram of the performance monitor information and form the first fingerprint from the first histogram and the second histogram;
in a training mode, when the first fingerprint and a second fingerprint are determined to be within a similarity threshold based on a distance metric, group the first fingerprint and the second fingerprint to form a cluster of fingerprints to be stored in a fingerprint database with a classification;
in a deployed mode, classify a third fingerprint, the third fingerprint to be classified with the classification associated with the cluster of fingerprints when a comparison of the third fingerprint to the cluster of fingerprints from the fingerprint database using the distance metric is within the similarity threshold; and trigger a remedial action when the classification is malicious.

9. The non-transitory computer readable storage medium of claim 8, wherein the instructions, when executed, cause the at least one processor to capture application execution behavior including i) target address information including points of control transfer within an address space of an application, and ii) application programming interface (API) call sequences.

10. The non-transitory computer readable storage medium of claim 9, wherein the instructions, when executed, cause the at least one processor to capture application execution behavior including at least one of dynamic linked library execution, just in time code execution, or shell code execution.

11. The non-transitory computer readable storage medium of claim 8, wherein the performance monitor information includes performance monitor unit counter values.

12. The non-transitory computer readable storage medium of claim 8, wherein the distance metric includes at least one of a Jaccard distance, a Hamming distance, a Euclidean distance, or a Cosine similarity.

13. The non-transitory computer readable storage medium of claim 8, wherein the instructions, when executed, cause the at least one processor to gather crowd telemetry from a plurality of systems to verify or change the classification.

14. The non-transitory computer readable storage medium of claim 13, wherein the instructions, when executed, cause the at least one processor to update the fingerprint database based on a change in the classification.

15. A method comprising:
processing, by executing an instruction with at least one processor, hardware and software telemetry events for an application in a processor trace to capture application execution behavior corresponding to processor control flow associated with the events;
extracting, by executing an instruction with the at least one processor, a first fingerprint from the captured application execution behavior and performance monitor information by at least calculating a first histogram of the captured application execution behavior and a second histogram of the performance monitor information and forming the first fingerprint from the first histogram and the second histogram;
in a training mode, when the first fingerprint and a second fingerprint are determined to be within a similarity threshold based on a distance metric, grouping, by executing an instruction with the at least one processor, the first fingerprint and the second fingerprint to form a cluster of fingerprints to be stored in a fingerprint database with a classification;
in a deployed mode, classifying, by executing an instruction with the at least one processor, a third fingerprint, the third fingerprint to be classified with the classification associated with the cluster of fingerprints when a comparison of the third fingerprint to the cluster of fingerprints from the fingerprint database using the distance metric is within the similarity threshold; and
triggering, by executing an instruction with the at least one processor, a remedial action when the classification is malicious.

16. The method of claim 15, further including capturing application execution behavior including i) target address information including points of control transfer within an address space of the application, and ii) application programming interface (API) call sequences.

17. The method of claim 16, further including capturing application execution behavior including at least one of dynamic linked library execution, just in time code execution, or shell code execution.

18. The method of claim 15, wherein the performance monitor information includes performance monitor unit counter values.

19. The method of claim 15, wherein the distance metric includes at least one of a Jaccard distance, a Hamming distance, a Euclidean distance, or a Cosine similarity.

20. The method of claim 15, further including gathering crowd telemetry from a plurality of systems to verify or change the classification.

21. The method of claim 20, further including updating the fingerprint database based on a change in the classification.

22. An apparatus comprising:
memory including machine readable instructions; and
at least one processor to execute the instructions to:
process hardware and software telemetry events for an application in a processor trace to capture application execution behavior corresponding to processor control flow associated with the events;
extract a first fingerprint from the captured application execution behavior and performance monitor information by at least calculating a first histogram of the captured application execution behavior and a second histogram of the performance monitor information and forming the first fingerprint from the first histogram and the second histogram;
in a training mode, when the first fingerprint and a second fingerprint are determined to be within a similarity threshold based on a distance metric, group the first fingerprint and the second fingerprint into a cluster to be stored in a fingerprint database with a classification;
in a deployed mode, classify a third fingerprint, the third fingerprint to be classified with the classification associated with the cluster of fingerprints when a comparison of the third fingerprint to the cluster of fingerprints from the fingerprint database using the distance metric is within the similarity threshold; and
trigger a remedial action when the classification is malicious.

23. The apparatus of claim 22, wherein the at least one processor is to capture application execution behavior including i) target address information including points of control transfer within an address space of an application, and ii) application programming interface (API) call sequences.

24. The apparatus of claim 23, wherein the at least one processor is to capture application execution behavior including at least one of dynamic linked library execution, just in time code execution, or shell code execution.

25. The apparatus of claim 22, wherein the performance monitor information includes performance monitor unit counter values.

26. The apparatus of claim 22, wherein the distance metric includes at least one of a Jaccard distance, a Hamming distance, a Euclidean distance, or a Cosine similarity.

27. The apparatus of claim 22, wherein the at least one processor is to gather crowd telemetry from a plurality of systems to verify or change the classification.

28. The apparatus of claim 27, wherein the at least one processor is to update the fingerprint database based on a change in the classification.

29. An apparatus comprising:
means for processing events in a processor trace to capture application execution behavior corresponding to processor control flow associated with the events;
means for extracting a first fingerprint from the captured application execution behavior and performance monitor information by at least calculating a first histogram of the captured application execution behavior and a second histogram of the performance monitor information and forming the first fingerprint from the first histogram and the second histogram calculating a first histogram of the captured application execution behavior and a second histogram of the performance monitor information and forming the first fingerprint from the first histogram and the second histogram;
means for clustering, in a training mode when the first fingerprint and a second fingerprint are compared and determined to be within a similarity threshold based on a distance metric, the first fingerprint and the second fingerprint to form a cluster of fingerprints to be stored in a fingerprint database with a classification; and
means for classifying, in a deployed mode, a third fingerprint, the means for classifying to classify the third fingerprint with the classification associated with the cluster of fingerprints when a comparison of the third fingerprint to the cluster of fingerprints from the fingerprint database using the distance metric is within the similarity threshold, the means for classifying to trigger a remedial action when the classification is malicious.

* * * * *